United States Patent
McConnell et al.

(10) Patent No.: US 12,492,298 B2
(45) Date of Patent: Dec. 9, 2025

(54) 2-ETHYLHEXANOYL SUBSTITUTED CELLULOSE ESTERS

(71) Applicant: Eastman Chemical Company, Kingsport, TN (US)

(72) Inventors: Wesley Wayne McConnell, Kingsport, TN (US); Mustafa Humbel Ahmed, Kingsport, TN (US); Bin Wang, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 857 days.

(21) Appl. No.: 17/753,179

(22) PCT Filed: Aug. 11, 2020

(86) PCT No.: PCT/US2020/045694
§ 371 (c)(1),
(2) Date: Feb. 23, 2022

(87) PCT Pub. No.: WO2021/041018
PCT Pub. Date: Mar. 4, 2021

(65) Prior Publication Data
US 2022/0289947 A1    Sep. 15, 2022

Related U.S. Application Data

(60) Provisional application No. 62/891,561, filed on Aug. 26, 2019.

(51) Int. Cl.
*C08L 1/14* (2006.01)
*C08B 3/16* (2006.01)
*G02B 5/30* (2006.01)

(52) U.S. Cl.
CPC ...... *C08L 1/14* (2013.01); *C08B 3/16* (2013.01); *G02B 5/30* (2013.01)

(58) Field of Classification Search
CPC . C08L 1/14; C08J 2301/14; C08J 5/18; G02B 5/3083
See application file for complete search history.

(56) References Cited

U.S. PATENT DOCUMENTS

| | | |
|---|---|---|
| 3,544,291 A | 12/1970 | Schlinger et al. |
| 3,817,725 A | 6/1974 | Sieg et al. |
| 3,841,851 A | 10/1974 | Kaiser |
| 3,909,364 A | 9/1975 | Singh |
| 4,052,173 A | 10/1977 | Schulz |
| 4,081,253 A | 3/1978 | Marion |
| 4,152,119 A | 5/1979 | Schulz |
| 4,199,327 A | 4/1980 | Hempill et al. |
| 4,225,457 A | 9/1980 | Schulz |
| 4,502,633 A | 3/1985 | Saxon |
| 4,886,000 A | 12/1989 | Hölter et al. |
| 5,323,714 A | 6/1994 | Cox |
| 5,445,659 A | 8/1995 | Khan et al. |
| 5,457,250 A | 10/1995 | Gerhardus et al. |
| 5,534,040 A | 7/1996 | Khan et al. |
| 5,656,042 A | 8/1997 | Khan et al. |
| 5,821,111 A | 10/1998 | Grady et al. |
| 5,904,879 A | 5/1999 | Winter et al. |
| 5,922,090 A | 7/1999 | Fujimura et al. |
| 5,984,985 A | 11/1999 | Malone |
| 6,063,355 A | 5/2000 | Fujimura et al. |
| 6,269,286 B1 | 7/2001 | Tse et al. |
| 6,321,666 B1 | 11/2001 | Tigonen |
| 6,401,635 B1 | 6/2002 | Nieminen et al. |
| 6,436,168 B1 | 8/2002 | Uematsu et al. |
| 6,439,135 B1 | 8/2002 | Pope |
| 6,676,716 B2 | 1/2004 | Fujimura et al. |
| 6,892,654 B2 | 5/2005 | Whittaker et al. |
| 7,425,315 B2 | 9/2008 | Kruesi |
| 7,453,393 B2 | 11/2008 | Duivenvoorden |
| 7,500,997 B2 | 3/2009 | Norbeck et al. |
| 7,531,618 B2 | 5/2009 | DeBruin |
| 8,083,818 B2 | 12/2011 | Ploeg et al. |
| 8,202,913 B2 | 6/2012 | Robinson et al. |
| 8,246,700 B1 | 8/2012 | Kutsin |
| 8,303,676 B1 | 11/2012 | Weaver et al. |
| 8,349,034 B2 | 1/2013 | Calabrese et al. |
| 8,349,039 B2 | 1/2013 | Robinson |
| 8,361,428 B2 | 1/2013 | Raman et al. |
| 8,580,152 B2 | 11/2013 | Sutradhar et al. |
| 8,585,789 B2 | 11/2013 | Sutradhar et al. |
| 8,722,958 B2 | 5/2014 | Kashimoto |
| 8,734,547 B2 | 5/2014 | Rappas et al. |
| 8,759,596 B2 | 6/2014 | Yie et al. |
| 8,828,105 B2 | 9/2014 | Calabrese et al. |

(Continued)

FOREIGN PATENT DOCUMENTS

EP    3445813 A1    2/2019

OTHER PUBLICATIONS

Notification of Transmittal of the International Search Report and the Written Opinion of the International Searching Authority with Date of Mailing Nov. 26, 2020 for International Application No. PCT/US2020/045694.

*Primary Examiner* — Catherine S Branch
*Assistant Examiner* — Olga Lucia Donahue
(74) *Attorney, Agent, or Firm* — Kenrick L. Vidale

(57) ABSTRACT

The present application discloses regioselectively substituted cellulose esters comprising 2-ethylhexanoyl substituents that have desirable mechanical properties that allow the cellulose esters to be stretched into larger and thinner films while still maintaining their optical properties.

18 Claims, No Drawings

(56) References Cited

U.S. PATENT DOCUMENTS

| | | |
|---|---|---|
| 8,863,518 B2 | 10/2014 | Koseoglu |
| 8,915,199 B2 | 12/2014 | Bohlig et al. |
| 8,957,275 B2 | 2/2015 | Stein et al. |
| 8,999,021 B2 | 4/2015 | Sutradhar et al. |
| 9,023,124 B2 | 5/2015 | Weaver et al. |
| 9,034,061 B2 | 5/2015 | Robinson et al. |
| 9,133,405 B2 | 9/2015 | Abughazaleh |
| 9,139,785 B2 | 9/2015 | Tsantrizos |
| 9,200,207 B2 | 12/2015 | Huang et al. |
| 9,416,077 B2 | 8/2016 | Kelfkens et al. |
| 9,698,439 B2 | 7/2017 | Weaver et al. |
| 9,834,728 B2 | 12/2017 | Fleckner et al. |
| 9,982,205 B2 | 5/2018 | Pichach |
| 10,329,501 B2 | 6/2019 | Bai et al. |
| 2001/0006036 A1 | 7/2001 | Kleiss |
| 2002/0113228 A1 | 8/2002 | Kim et al. |
| 2003/0131582 A1 | 7/2003 | Anderson et al. |
| 2004/0031424 A1 | 2/2004 | Pope |
| 2004/0103831 A1 | 6/2004 | Pope |
| 2004/0244289 A1 | 12/2004 | Morozumi et al. |
| 2005/0000162 A1 | 1/2005 | Bishop et al. |
| 2006/0165582 A1 | 7/2006 | Brooker et al. |
| 2006/0219139 A1 | 10/2006 | Pope et al. |
| 2006/0251547 A1 | 11/2006 | Windes et al. |
| 2007/0051043 A1 | 3/2007 | Schingnitz et al. |
| 2007/0204512 A1 | 9/2007 | Self et al. |
| 2008/0081844 A1 | 4/2008 | Shires et al. |
| 2008/0147241 A1 | 6/2008 | Tsangaris et al. |
| 2008/0241430 A1 | 10/2008 | Tomoko |
| 2009/0093600 A1 | 4/2009 | Moore et al. |
| 2009/0217587 A1 | 9/2009 | Raman et al. |
| 2009/0217588 A1 | 9/2009 | Hippo et al. |
| 2009/0321317 A1 | 12/2009 | Widmer et al. |
| 2010/0038594 A1 | 2/2010 | Bohlig et al. |
| 2010/0042557 A1 | 2/2010 | Block et al. |
| 2010/0139534 A1 | 6/2010 | Tsantrizos |
| 2010/0186291 A1 | 7/2010 | Yie et al. |
| 2010/0298449 A1 | 11/2010 | Rojey |
| 2011/0185624 A1 | 8/2011 | Hall |
| 2011/0282049 A1 | 11/2011 | Shelton et al. |
| 2012/0032452 A1 | 2/2012 | Kuku |
| 2012/0238741 A1 | 9/2012 | Buchanan et al. |
| 2013/0082210 A1 | 4/2013 | Gautam et al. |
| 2013/0143973 A1 | 6/2013 | Townsend et al. |
| 2013/0269252 A1 | 10/2013 | Tsangaris et al. |
| 2014/0290593 A1 | 10/2014 | Krammer |
| 2015/0005398 A1 | 1/2015 | Chakravarti et al. |
| 2015/0096222 A1 | 4/2015 | Calabrese et al. |
| 2015/0211736 A1 | 7/2015 | Bohlig et al. |
| 2015/0232771 A1 | 8/2015 | Bell et al. |
| 2015/0337206 A1 | 11/2015 | Iwasa |
| 2016/0108137 A1* | 4/2016 | Buchanan ............... C08B 1/003 536/64 |
| 2016/0122672 A1 | 5/2016 | White |
| 2017/0088783 A1 | 3/2017 | Nawrocki |
| 2017/0307796 A1 | 10/2017 | Boone et al. |
| 2017/0312718 A1 | 11/2017 | Tawfik |
| 2019/0010050 A1 | 1/2019 | Chandran et al. |
| 2020/0247910 A1 | 8/2020 | Sheppard et al. |
| 2020/0248082 A1 | 8/2020 | Trapp et al. |
| 2020/0248085 A1 | 8/2020 | Trapp et al. |
| 2020/0248086 A1 | 8/2020 | Trapp et al. |

* cited by examiner

2-ETHYLHEXANOYL SUBSTITUTED CELLULOSE ESTERS

CROSS-REFERENCE TO RELATED APPLICATION(S)

This application is a national stage filing under 35 USC § 371 of International Application Number PCT/US2020/045694, filed on, Aug. 11, 2020 which claims the benefit of the filing date to U.S. Provisional Application No. 62/891,561, filed on Aug. 26, 2019, the entire disclosures of which are incorporated by reference herein.

BACKGROUND OF THE INVENTION

Cellulose esters such as cellulose triacetate ("CTA" or "TAC"), cellulose acetate propionate ("CAP"), and cellulose acetate butyrate ("CAB"), are used in a wide variety of films for the liquid crystal display ("LCD") and organic LED display ("OLED") industries. Most notable is their use as protective and compensation films used in conjunction with polarizer sheets. These films can typically be made by solvent casting, and then be laminated to either side of an oriented, iodinated polyvinyl alcohol ("PVOH") polarizing film to protect the PVOH layer from scratching and moisture ingress, while also increasing structural rigidity. When used as compensation films (a.k.a., waveplates), they can be laminated with the polarizer stack or otherwise included between the polarizer and liquid crystal/OLED layers. The waveplates can act to improve the contrast ratio, wide viewing angle, and color shift performance of the LCD/OLED. While significant advances have been made in LCD/OLED technology, improvements are still needed.

There is a need for larger and thinner cellulose ester films that have good mechanical properties for large display applications that still maintain optical properties useful in displays. Applicants have discovered that novel regioselectively substituted cellulose esters that have 2-ethylhexanoyl substituents are useful due to their desired mechanical properties besides optical properties which allows them to be stretched into thinner and larger size films.

SUMMARY OF THE INVENTION

The present application discloses a cellulose ester comprising:
(i) a plurality of 2-ethylhexanoyl ("2EH") substituents;
(ii) a plurality of $(C_{1-6})$alkyl-CO— ("AkCO") substituents;
(iii) a plurality of hydroxy ("OH") substituents; and
(iv) a plurality of $R^1$—CO— ("ChCO") substituents,
wherein:
  $R^1$ is
    (1) an $(C_{10-20})$aryl, wherein the aryl is unsubstituted or substituted by 1-5 $R^2$,
    (2) a 5-10 membered heteroaryl having 1 to 4 heteroatoms chosen from N, O, or S, wherein heteroaryl is unsubstituted or substituted by 1-5 $R^2$,
    (3)

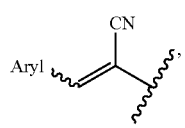

wherein the aryl is a $(C_{1-6})$aryl, and wherein the aryl is unsubstituted or substituted by 1-5 $R^2$; or
    (4)

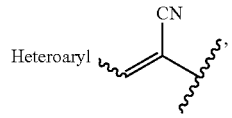

wherein the heteroaryl is a 5- to 10-membered ring having 1-4 heteroatoms chosen from N, O or S, and wherein the heteroaryl is unsubstituted or substituted by 1-5 $R^2$,
each $R^2$ is independently chosen from nitro, cyano, $(C_{1-6})$alkyl, halo$(C_{1-6})$alkyl; $(C_{6-20})$aryl-$CO_2$—, $(C_{6-20})$aryl, $(C_{1-6})$alkoxyl, halo$(C_{1-6})$alkyoxyl, halo, 5-10 membered heteroaryl having 1-4 heteroatoms chosen from N, O, or S, or

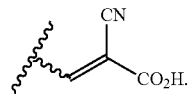

The present application also discloses a regioselectively substituted cellulose ester comprising:
(i) a plurality of 2-ethylhexanoyl ("2EH") substituents, wherein the cellulose ester has a degree of substitution for the 2EH ("$DS_{2EH}$") of from 0.1 to 1.0;
(ii) a plurality of $(C_{1-6})$alkyl-CO— ("AkCO") substituents, wherein the cellulose ester has a degree of substitution for AkCO ("$DS_{AkCO}$") of from 1.0 to 1.5;
(iii) a plurality of hydroxy ("OH") substituents, wherein the cellulose ester has a degree of substitution for OH ("$DS_{OH}$") less than 0.8;
(iv) a plurality of $R^1$—CO— ("ChCO") substituents, wherein the cellulose ester has a degree of substitution for ChCO ("$DS_{ChCO}$") of from 0.5 to 1.5,
wherein:
  $R^1$ is
    (1) an $(C_{10-20})$aryl, wherein the aryl is unsubstituted or substituted by 1-5 $R^2$,
    (2) a 5-10 membered heteroaryl having 1 to 4 heteroatoms chosen from N, O, or S, wherein heteroaryl is unsubstituted or substituted by 1-5 $R^2$,
    (3)

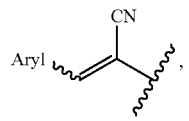

wherein the aryl is a $(C_{1-6})$aryl, and wherein the aryl is unsubstituted or substituted by 1-5 $R^2$; or
    (4)

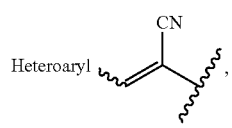

wherein the heteroaryl is a 5- to 10-membered ring having 1-4 heteroatoms chosen from N, O or S, and wherein the heteroaryl is unsubstituted or substituted by 1-5 $R^2$, each $R^2$ is independently chosen from nitro, cyano, $(C_{1-6})$alkyl, halo$(C_{1-6})$alkyl; $(C_{6-20})$aryl-$CO_2$—, $(C_{6-20})$aryl, $(C_{1-6})$alkoxyl, halo$(C_{1-6})$alkyoxyl, halo, 5-10 membered heteroaryl having 1-4 heteroatoms chosen from N, O, or S, or

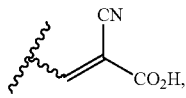

wherein the cellulose ester has a degree of substitution of the AkCO substituent at the C2 position ("$C2DS_{AkCO}$") in the range of from 0.2 to 0.3, a degree of substitution of AkCO substituent at the C3 position ("$C3DS_{AkCO}$") in the range of from 0.2 to 0.4, and a degree of substitution of AkCO substituent at the C6 position ("$C6DS_{AkCO}$") in the range of from 0.5 to 0.7.

The present application discloses a regioselectively substituted cellulose ester comprising:

(i) a plurality of 2-ethylhexanoyl ("2EH") substituents, wherein the cellulose ester has a degree of substitution for the 2EH ("$DS_{2EH}$") of from 0.1 to 1.0;

(ii) a plurality of $(C_{1-6})$alkylCO ("AkCO") substituents, wherein the cellulose ester has a degree of substitution for AkCO ("$DS_{AkCO}$") of from 1.0 to 1.5;

(iii) a plurality of hydroxy ("OH") substituents, wherein the cellulose ester has a degree of substitution for OH ("$DS_{OH}$") less than 0.8;

(iv) a plurality of $R^1$—CO— ("ChCO") substituents, wherein the cellulose ester has a degree of substitution for ChCO ("$DS_{ChCO}$") of from 0.5 to 1.5, wherein:

$R^1$ is phenyl, wherein the phenyl is unsubstituted or substituted by 1-5 $R^2$, each $R^2$ is independently chosen from nitro, cyano, $(C_{1-6})$alkyl, halo$(C_{1-6})$alkyl; $(C_{6-20})$aryl-$CO_2$—, $(C_{6-20})$aryl, $(C_{1-6})$alkoxyl, halo$(C_{1-6})$alkyoxyl, halo, 5-10 membered heteroaryl having 1-4 heteroatoms chosen from N, O, or S, or

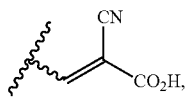

wherein the cellulose ester has a degree of substitution of the AkCO substituent at the C2 position ("$C2DS_{AkCO}$") in the range of from 0.2 to 0.3, a degree of substitution of AkCO substituent at the C3 position ("$C3DS_{AkCO}$") in the range of from 0.2 to 0.4, and a degree of substitution of AkCO substituent at the C6 position ("$C6DS_{AkCO}$") in the range of from 0.5 to 0.7.

The present application also discloses films prepared from the cellulose ester disclosed here.

DETAILED DESCRIPTION OF THE INVENTION

The present invention may be understood more readily by reference to the following detailed description of the invention and the examples provided therein. It is to be understood that this invention is not limited to the specific methods, formulations, and conditions described, as such may vary. It is also to be understood that the terminology used herein is for the purpose of describing particular aspects of the invention only and is not intended to be limiting.

Definitions

In this specification and in the claims that follow, reference will be made to a number of terms, which shall be defined to have the following meanings.

Values may be expressed as "about" or "approximately" a given number. Similarly, ranges may be expressed herein as from "about" one particular value and/or to "about" or another particular value. When such a range is expressed, another aspect includes from the one particular value and/or to the other particular value. Similarly, when values are expressed as approximations, by use of the antecedent "about," it will be understood that the particular value forms another aspect.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "includes," and "include" have the same open-ended meaning as "comprising," "comprises," and "comprise" provided above.

"Degree of substitution" means the average number of substituents per anhydroglucose monomer of the cellulose ester. Degree of substitution can refer to a substituent attached to the anhydroglucose monomer, for example an acyl group (e.g., $DS_{acyl}$). Degree of substitution can also refer to the number of free or unsubstituted hydroxy groups on the anhydroglucose monomer and is shown as $DS_{OH}$. The total degree of substitution includes the total of the degree of substitution for the acyl substituents. In determining the total degree of substitution, the $DS_{OH}$ is not included in the calculation. The degree of substitution can specify the position on the anhydroglucose monomer. For example, the degree of substitution can apply to the C2, C3, or C6 position of the anhydroglucose monomer(e.g., C2DS, C3DS, C6DS):

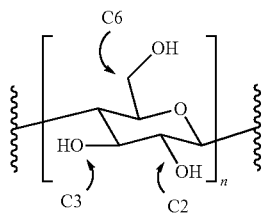

"Degree of polymerization" means the number of glucose units that make up one polymer molecule. The degree of polymerization ("DP") of the cellulose esters prepared by these methods can be at least 10. In other embodiments, the DP of the cellulose esters can be at least 50, at least 100, or at least 250. In other embodiments, the DP of the cellulose esters can be in the range of from about 5 to about 100, or in the range of from about 10 to about 50.

As used herein, the term "acyl substituent" or shall denote a substituent having the structure:

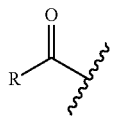

For example, acyl substituents can be expressed as $(C_{1-6})$alkyl-CO— or $R^1$—CO—. Such acyl substituents in cellulose esters are generally bound to the pyranose ring of the cellulose via an ester linkage (i.e., through an oxygen atom).

As used herein, the term "alkyl-CO" which is an acyl substituent shall denote an acyl substituent where "R" is an alkyl group.

As used herein, the term "alkyl" shall denote a univalent group formed by removing a hydrogen atom from a non-aromatic hydrocarbon, and may include heteroatoms. Alkyl groups suitable for use herein can be straight, branched, or cyclic. Alkyl groups suitable for use herein include any $(C_{1-20})$, $(C_{1-12})$, $(C_{1-5})$, or $(C_{1-3})$ alkyl groups. In various embodiments, the alkyl can be a $C_{1-5}$ straight or branched chain alkyl group. In still other embodiments, the alkyl can be a $C_{1-3}$ straight or branched chain alkyl group. Specific examples of suitable alkyl groups include, but are not limited to, methyl, ethyl, n-propyl, isopropyl, n-butyl, isobutyl, sec-butyl, tert-butyl, pentyl, hexyl, octyl, decyl, dodecyl, cyclopentyl, and cyclohexyl groups. Examples of alkyl-acyl or alkyl-CO— groups include acetyl, propionyl, butyroyl, and the like.

As used herein, the term "aryl-CO—" shall denote an acyl substituent where "R" is an aryl group.

As used herein, the term "aryl" shall denote a univalent group formed by removing a hydrogen atom from a ring carbon in an arene (i.e., a mono- or polycyclic aromatic hydrocarbon). In some cases the aryl-acyl group is preceded by the carbon units: For example, $(C_{5-6})$aryl-acyl, $(C_{6-12})$aryl-acyl, or $(C_{6-20})$aryl-acyl. Examples of aryl groups suitable for use in various embodiments include, but are not limited to, phenyl, benzyl, tolyl, xylyl, and naphthyl. Such aryl groups can be substituted or unsubstituted.

As used herein, the term "heteroaryl-CO" shall denote an acyl substituent where "R" is a heteroaryl group.

As used herein, the term "heteroaryl" is an aryl group where one or more ring carbons are replaced heteroatoms such as nitrogen, oxygen, and/or sulfur. In some cases the heteroaryl-CO— group is defined by the amount of atoms make up the heteroaryl ring, for example a 5-10 membered ring. The heteroaryl-CO— group can also be defined by the number of heteroatoms possible in the ring systems, for example 1-4 N, O, or S heteroatoms. Examples of heteoaryl groups suitable for use in various embodiments include, but are not limited to, furanyl, benzothiophen-yl, pyrrolyl, thiophen-yl, pypyridinyl, pyrazinyl, pyridazinyl, pyrimidinyl, quinolinyl, isoquinolinyl, quinoxalinyl, quinazolinyl, or phthalazinyl. Such hetetoaryl groups can be substituted or unsubstituted.

"Haloalkyl" means an alkyl substituent where at least one hydrogen is replaced with a halogen group. The carbon units in the haloalkyl group is often included; for example halo $(C_{1-6})$alkyl. The haloalkyl group can be straight or branched. Nonlimiting examples of haloalkyl include chloromethyl, trifluoromethyl, dibromoethyl and the like.

"Alkenyl" means an alkyl group of at least two carbon units containing at least one double bond. The carbon units in the alkenyl group is often included; for example $(C_{2-6})$ alkenyl. The alkenyl group can be straight or branched. Nonlimiting examples of alkenyl include ethenyl, allyl, 1-butenyl, and the like.

"Cycloalkyl" means a cyclic alkyl group having at least three carbon units. The carbon units in the cycloalkyl group is often included; for example $(C_{3-8})$cycloalkyl. Nonlimiting examples of cycloalkyl include cyclopropyl, cyclobutyl, cyclohexyl, cycloheptyl, and the like.

"Alkoxy" means alkyl-O— or an alkyl group terminally attached to an oxygen group. Often the carbon units are included; for example $(C_{1-6})$alkoxy. Nonlimiting examples of alkoxy include methoxy, ethoxy, propoxy and the like.

"Haloalkoxy" means alkoxy where at least one of the hydrogens is replace with a halogen. Often the carbon units are included; for example halo$(C_{1-6})$alkoxy. Nonlimiting examples of haloalkoxy include trifluoromethoxy, bromomethoxy, 1-bromo-ethoxy and the like.

"Halo" means halogen such as fluoro, chloro, bromo, or iodo.

As used herein, the term "substantially" means within 5%. For example, substantially perpendicular means a range of from 84.5 degrees to 94.5 degrees. Substantially consumed means at least 95% or more has been consumed.

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

The present description uses specific numerical values to quantify certain parameters relating to the invention, where the specific numerical values are not expressly part of a numerical range. It should be understood that each specific numerical value provided herein is to be construed as providing literal support for a broad, intermediate, and narrow range. The broad range associated with each specific numerical value is the numerical value plus and minus 60 percent of the numerical value, rounded to two significant digits. The intermediate range associated with each specific numerical value is the numerical value plus and minus 30 percent of the numerical value, rounded to two significant digits. The narrow range associated with each specific numerical value is the numerical value plus and minus 15 percent of the numerical value, rounded to two significant digits. For example, if the specification describes a specific temperature of 62° F., such a description provides literal support for a broad numerical range of 25° F. to 99° F. (62° F.+/−37° F.), an intermediate numerical range of 43° F. to 81° F. (62° F.+/−19° F.), and a narrow numerical range of 53° F. to 71° F. (62° F.+/−9° F.). These broad, intermediate, and narrow numerical ranges should be applied not only to the specific values, but should also be applied to differences between these specific values. Thus, if the specification describes a first pressure of 110 psia and a second pressure of 48 psia (a difference of 62 psi), the broad, intermediate, and narrow ranges for the pressure difference between these two streams would be 25 to 99 psi, 43 to 81 psi, and 53 to 71 psi, respectively.

The cellulose esters prepared by the methods of this invention are useful in a variety of applications. Those skilled in the art will understand that the specific application will depend upon the specific type of cellulose ester as factors such as the type of acyl substituent, DS, MW, and type of cellulose ester copolymer significantly impact cellulose ester physical properties. *Prog. Polym. Sci.* 2001, 26, 1605-1688.

The cellulose esters thus prepared generally comprise the following structure:

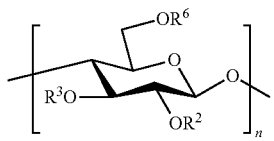

where $R^2$, $R^3$, and $R^6$ are hydrogen (with the proviso that $R^2$, $R^3$, and $R^6$ are not hydrogen simultaneously), alkyl-acyl groups, and/or aryl-acyl groups (such as those described above) bound to the cellulose via an ester linkage.

Throughout this application, where patents or publications are referenced, the disclosures of these references in their entireties are intended to be incorporated by reference into this application, to the extent they are not inconsistent with the present invention, in order to more fully describe the state of the art to which the invention pertains.

Films prepared from cellulose esters can be employed in liquid crystal displays ("LCD") or organic light emitting diode ("OLED") displays. Generally, LCDs employ a polarizer stacking including a set of crossed polarizers. For a typical set of crossed polarizers used in an LCD, there can be significant light leakage along the diagonals (leading to poor contrast ratio), particularly as the viewing angle is increased. Various optical films can be used to correct or "compensate" for this light leakage. These films can have certain well defined birefringences (or retardations) that vary depending on the type of liquid crystal cell used, since the liquid crystal cell itself will also impart a certain degree of undesirable optical retardation that must be corrected. Some of these compensation films are easier to make than others, so compromises are often made between performance and cost. Also, while most compensation and protective films are made by solvent casting, there is a push to make more films by melt extrusion so as to eliminate the need to handle environmentally unfriendly solvents. Having a material with more controllable optical retardation, that can be made by both solvent and melt casting, allows for greater flexibility in creating these films.

Optical films are commonly quantified in terms of birefringence which is, in turn, related to the refractive index n. The refractive index can typically be in the range of 1.4 to 1.8 for polymers in general, and can be approximately 1.46 to 1.50 for cellulose esters. The higher the refractive index, the slower a light wave propagates through that given material.

For an unoriented isotropic material, the refractive index will be the same regardless of the polarization state of the entering light wave. As the material becomes oriented, or otherwise anisotropic, the refractive index becomes dependent on material direction. For purposes of the present invention, there are three refractive indices of importance, denoted $n_x$, $n_y$, and $n_z$, which correspond to the machine direction ("MD"), the transverse direction ("TD") and the thickness direction respectively. As the material becomes more anisotropic (e.g., by stretching), the difference between any two refractive indices will increase. This difference is referred to as the "birefringence." Because there are many combinations of material directions to choose from, there are correspondingly different values of birefringence. The two that are the most common, namely the planar birefringence (or "in-plane" birefringence) $\Delta_e$ and the thickness birefringence (or "out-of-plane" birefringence) $\Delta_{th}$, are defined as:

$$\Delta_e = n_x - n_y \tag{1a}$$

$$\Delta_{th} = n_z - (n_x + n_y)/2 \tag{1b}$$

The birefringence $\Delta_e$ is a measure of the relative in-plane orientation between the MD and TD directions and is dimensionless. In contrast $\Delta_{th}$ gives a measure of the orientation of the thickness direction, relative to the average planar orientation.

Another term often used with regards to optical films is the optical retardation R. R is simply the birefringence times the thickness d, of the film in question. Thus, $$R_e = \Delta_e d = (n_x - n_y)d \tag{2a}$$

$$R_{th} = \Delta_{th} d = [n_z - (n_x + n_y)/2]d \tag{2b}$$

Retardation is a direct measure of the relative phase shift between the two orthogonal optical waves and is typically reported in units of nanometers (nm). Note that the definition of $R_{th}$ varies among some authors, particularly with regards to the sign (+/−), depending on how $R_{th}$ is calculated.

Materials are also known to vary with regards to their birefringence/retardation behavior. For example, most materials when stretched will exhibit a higher refractive index along the stretch direction and a lower refractive index perpendicular to the stretch. This follows because, on a molecular level, the refractive index is typically higher along the polymer chain's axis and lower perpendicular to the chain. These materials are commonly termed "positively birefringent" and represent most standard polymers, including current commercial cellulose esters. Note that, as we will describe later, a positively birefringent material can be used to make either positive or negative birefringent films or waveplates.

To avoid confusion, the birefringence behavior of the polymer molecule itself will be referred to as the "intrinsic birefringence" and is a property of the polymer. From a material optics standpoint, intrinsic birefringence is a measure of the birefringence that would occur if the material was fully stretched with all chains perfectly aligned in one direction (for most polymers this is a theoretical limit since they can never be fully aligned). For purposes of the present invention, it also provides a measure of the sensitivity of a given polymer to a given amount of chain orientation. For example, a sample with high intrinsic birefringence is going to exhibit more birefringence during film formation than a sample with low intrinsic birefringence, even though the relative stress levels in the film are approximately the same.

Polymers can have positive, negative, or zero intrinsic birefringence. Negative intrinsic birefringent polymers exhibit a higher refractive index perpendicular to the stretch direction (relative to the parallel direction). Certain styrenics and acrylics can have negative intrinsic birefringent behavior due to their rather bulky side groups. Depending on composition, some cellulose esters having aromatic ring structures can exhibit negative intrinsic birefringence as well. Zero intrinsic birefringence, in contrast, is a special case and represents materials that show no birefringence with stretching and thus have a zero intrinsic birefringence. Such materials can be ideal for certain optical applications as they can be molded, stretched, or otherwise stressed during processing without showing any optical retardation or distortion.

The actual compensation film(s) that is/are used in an LCD can take on a variety of forms including biaxial films where all three refractive indices differ and two optical axes exist, and uniaxial films having only one optical axis where two of the three refractive indices are the same. There are also other classes of compensation films where the optical axes twist or tilt through the thickness of the film (e.g., discotic films), but these are generally of lesser importance. Generally, the type of compensation film that can be made is limited by the birefringence characteristics of the polymer (i.e., positive, negative or zero intrinsic birefringence). A few examples are described below.

In the case of uniaxial films, a film having refractive indices such that $$n_x > n_y = n_z \text{ "+A" optical film} \quad (3a)$$

is denoted as a "+A" optical film. In such films, the x-direction (machine direction) of the film has a high refractive index, whereas the y and thickness directions are approximately equal in magnitude (and lower than $n_x$). This type of film is also referred to as a positive uniaxial crystal structure with the optic axis along the x-direction. Such films can be made by uniaxially stretching a positive intrinsic birefringent material using, for example, a film stretcher.

In contrast, a "−A" uniaxial film is defined as $$n_x < n_y = n_z \text{ "−A" optical film} \quad (3b)$$

where the x-axis refractive index is lower than the other directions (which are approximately equal). One method for making a −A optical film is to stretch a negative intrinsic birefringent polymer or, alternately, by coating a negatively (intrinsic) birefringent liquid crystal polymer onto a surface such that the molecules are lined up in a preferred direction (for example, by using an underlying etched orientation layer).

In terms of retardation, "±A" optical films have the following relationship between $R_e$ and $R_{th}$, shown in (3c):

$$R_{th} = -R_e/2 \text{ "±A" optical films} \quad (3c)$$

Another class of uniaxial optical films is the C optical film which can also be "+C" or "−C". The difference between a C and an A optical film is that, in C optical films, the unique refractive index (or optical axis) is in the thickness direction as opposed to in the plane of the film. Thus, $$n_z > n_y = n_x \text{ "+C" optical film} \quad (4a)$$

$$n_z < n_y = n_x \text{ "−C" optical film} \quad (4b)$$

C optical films can be produced by taking advantage of the stresses that form during solvent casting of a film. Tensile stresses are generally created in the plane of the film due to the restraint imposed by the casting belt, which are also equi-biaxial stretched in nature. These tend to align the chains in the plane of the film resulting in −C or +C films for positive and negative intrinsic birefringent materials respectively. As many cellulose ester films used in displays are solvent cast, and many are essentially positive birefringent, then it is apparent that solvent cast cellulose esters normally only produce −C optical films. These films can also be uniaxially stretched to produce +A optical films (assuming the initial as-cast retardation is very low).

Besides uniaxial optical films, it is also possible to use biaxial oriented films. Biaxial films are quantified in a variety of ways including simply listing the 3 refractive indices $n_x$, $n_y$ and $n_z$ in the principal directions (along with the direction of these principal axes). Generally, $n_x \neq n_y \neq n_z$.

One specific biaxial oriented film has unique optical properties to compensate light leakage of a pair of crossed polarizers or in-plane switching ("IPS") mode liquid crystal displays. The optical film has a parameter Nz in the range of from about 0.4 to about 0.9, or equals about 0.5, where Nz is defined as $$N_z = (n_x - n_z)/(n_x - n_y) \quad (5)$$

This parameter gives the effective out-of-plane birefringence relative to the in-plane birefringence. Nz can be chosen to be about 0.5 when used as a compensation film for a pair of crossed polarizers. When Nz is about 0.5, the corresponding out-of-plane retardation, $R_{th}$, equals about 0.0 nm.

To show the optical film's compensation effect, the following light transmission or leakage of a pair of crossed polarizers with and without compensation films is calculated by computer simulation.

Compositions

The present application discloses a cellulose ester comprising: (i) a plurality of 2-ethylhexanoyl ("2EH") substituents; (ii) a plurality of $(C_{1-6})$alkyl-CO ("AkCO") substituents; (iii) a plurality of hydroxy ("OH") substituents; and (iv) a plurality of $R^1$—CO— ("ChCO") substituents, wherein: $R^1$ is (1) an $(C_{10-20})$aryl, wherein the aryl is unsubstituted or substituted by 1-5 $R^2$, (2) a 5-10 membered heteroaryl having 1 to 4 heteroatoms chosen from N, O, or S, wherein heteroaryl is unsubstituted or substituted by 1-5 $R^2$, (3)

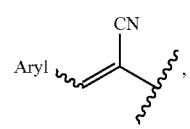

wherein the aryl is a $(C_{1-6})$aryl, and wherein the aryl is unsubstituted or substituted by 1-5 $R^2$; or (4)

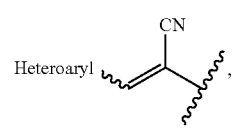

wherein the heteroaryl is a 5- to 10-membered ring having 1-4 heteroatoms chosen from N, O or S, and wherein the heteroaryl is unsubstituted or substituted by 1-5 $R^2$, each $R^2$ is independently chosen from nitro, cyano, $(C_{1-6})$alkyl, halo$(C_{1-6})$alkyl; $(C_{6-20})$aryl-$CO_2$—, $(C_{6-20})$aryl, $(C_{1-6})$ alkoxyl, halo$(C_{1-6})$alkyoxyl, halo, 5-10 membered heteroaryl having 1-4 heteroatoms chosen from N, O, or S, or

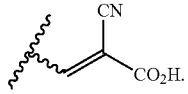

In one embodiment, $R^1$ is an $(C_{10-20})$aryl, wherein the aryl is unsubstituted or substituted by 1-5 $R^2$. In one class of this embodiment, $R^1$ is naphthyl, which is unsubstituted or substituted by 1-5 $R^2$. In one class of this embodiment, $R^1$ is naphthyl, which is unsubstituted. In one class of this embodiment, $R^1$ is naphthyl, which is substituted by 1-5 $R^2$.

In one class of this embodiment, the cellulose ester has a degree of substitution for 2EH ("$DS_{2EH}$") that is from 0.1 to 1.0. In one subclass of this class, the cellulose ester has a degree of substitution for ChCO ("$DS_{ChCO}$") that is from 0.5 to 1.5.

In one class of this embodiment, the cellulose ester has a degree of substitution for 2EH ("$DS_{2EH}$") that is from 0.3 to 0.5. In one subclass of this class, the cellulose ester has a degree of substitution for ChCO ("$DS_{ChCO}$") that is from 0.5 to 1.5.

In one class of this embodiment, the cellulose ester has a degree of substitution for 2EH ("$DS_{2EH}$") that is from 0.2 to 0.6, a degree of substitution for OH ("$DS_{OH}$") that is less than 0.7, and a degree of substitution for the Akacyl ("$DS_{Akacyl}$") that is from 1.0 to 1.5.

In one embodiment, $R^1$ is an $(C_{10-20})$aryl, wherein the aryl is unsubstituted. In one embodiment, $R^1$ is an $(C_{10-20})$aryl, wherein the aryl is substituted by 1-5 $R^2$.

In one embodiment, $R^1$ is a 5-10 membered heteroaryl having 1 to 4 heteroatoms chosen from N, O, or S, wherein the heteroaryl is unsubstituted or substituted by 1-5 $R^2$.

In one class of this embodiment, the cellulose ester has a degree of substitution for 2EH ("$DS_{2EH}$") that is from 0.1 to 1.0. In one subclass of this class, the cellulose ester has a degree of substitution for ChCO ("$DS_{ChCO}$") that is from 0.5 to 1.5.

In one class of this embodiment, the cellulose ester has a degree of substitution for 2EH ("$DS_{2EH}$") that is from 0.3 to 0.5. In one subclass of this class, the cellulose ester has a degree of substitution for ChCO ("$DS_{ChCO}$") that is from 0.5 to 1.5.

In one class of this embodiment, the cellulose ester has a degree of substitution for 2EH ("$DS_{2EH}$") that is from 0.2 to 0.6, a degree of substitution for OH ("$DS_{OH}$") that is less than 0.7, and a degree of substitution for the Akacyl ("$DS_{Akacyl}$") that is from 1.0 to 1.5.

In one class of this embodiment, $R^1$ is furanyl, benzothiophen-yl

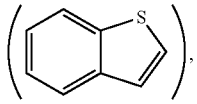

pyrrolyl, thiophen-yl

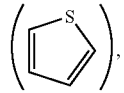

pyridinyl, pyrazinyl, pyridazinyl, pyrimidinyl, quinolinyl, isoquinolinyl, quinoxalinyl, quinazolinyl, or phthalazinyl, which is unsubstituted or substituted by 1-5 $R^2$. In one class of this embodiment, $R^1$ is furanyl, benzothiophen-yl, pyrrolyl, thiophen-yl, pyridinyl, pyrazinyl, pyridazinyl, pyrimidinyl, quinolinyl, isoquinolinyl, quinoxalinyl, quinazolinyl, or phthalazinyl, wherein each ring is unsubstituted. In one class of this embodiment, $R^1$ is furanyl, benzothiophen-yl, pyrrolyl, thiophen-yl, pyridinyl, pyrazinyl, pyridazinyl, pyrimidinyl, quinolinyl, isoquinolinyl, quinoxalinyl, quinazolinyl, or phthalazinyl, wherein each ring is substituted by 1-5 $R^2$. In one class of this embodiment, $R^1$ is furanyl, pyrrolyl, benzothiophen-yl, or thiofuranyl, wherein each ring is substituted by 1-5 $R^2$. In one class of this embodiment, $R^1$ is furanyl, pyrrolyl, benzothiophen-yl, or thiofuranyl, wherein each ring is unsubstituted. In one class of this embodiment, $R^1$ is furanyl, pyrrolyl, benzothiophen-yl, or thiofuranyl, wherein each ring is substituted by 1-5 $R^2$. In one class of this embodiment, $R^1$ is furanyl, wherein each ring is substituted by 1-5 $R^2$. In one class of this embodiment, $R^1$ is furanyl, which is unsubstituted. In one class of this embodiment, $R^1$ is furanyl, substituted by 1-5 $R^2$. In one class of this embodiment, $R^1$ is benzothiophen-yl, wherein each ring is unsubstituted or substituted by 1-5 $R^2$. In one class of this embodiment, $R^1$ is benzothiophen-yl, which is unsubstituted. In one class of this embodiment, $R^1$ is benzothiophen-yl, substituted by 1-5 $R^2$. In one class of this embodiment, $R^1$ is pyrrolyl, wherein each ring is unsubstituted or substituted by 1-5 $R^2$. In one class of this embodiment, $R^1$ is pyrrolyl, which is unsubstituted. In one class of this embodiment, $R^1$ is pyrrolyl, substituted by 1-5 $R^2$. In one class of this embodiment, $R^1$ is thiophenyl, wherein each ring is unsubstituted or substituted by 1-5 $R^2$. In one class of this embodiment, $R^1$ is thiophenyl, which is unsubstituted. In one class of this embodiment, $R^1$ is thiophenyl, substituted by 1-5 $R^2$. In one class of this embodiment, $R^1$ is pyridinyl, wherein each ring is unsubstituted or substituted by 1-5 $R^2$. In one class of this embodiment, $R^1$ is pyridinyl, which is unsubstituted. In one class of this embodiment, $R^1$ is pyridinyl, substituted by 1-5 $R^2$. In one class of this embodiment, $R^1$ is pyrazinyl, wherein each ring is unsubstituted or substituted by 1-5 $R^2$. In one class of this embodiment, $R^1$ is pyrazinyl, which is unsubstituted. In one class of this embodiment, $R^1$ is pyrazinyl, substituted by 1-5 $R^2$. In one class of this embodiment, $R^1$ is pyridazinyl, wherein each ring is unsubstituted or substituted by 1-5 $R^2$. In one class of this embodiment, $R^1$ is pyridazinyl, which is unsubstituted. In one class of this embodiment, $R^1$ is pyridazinyl, substituted by 1-5 $R^2$. In one class of this embodiment, $R^1$ is pyrimidinyl, wherein each ring is unsubstituted or substituted by 1-5 $R^2$. In one class of this embodiment, $R^1$ is pyrimidinyl, which is unsubstituted. In one class of this embodiment, $R^1$ is pyrimidinyl, substituted by 1-5 $R^2$. In one class of this embodiment, $R^1$ is quinolinyl, wherein each ring is unsubstituted or substituted by 1-5 $R^2$. In one class of this embodiment, $R^1$ is quinolinyl, which is unsubstituted. In one class of this embodiment, $R^1$ is quinolinyl, substituted by 1-5 $R^2$. In one class of this embodiment, $R^1$ is isoquinolinyl, wherein each ring is unsubstituted or substituted by 1-5 $R^2$.

In one class of this embodiment, R¹ is isoquinolinyl, which is unsubstituted. In one class of this embodiment, R¹ is isoquinolinyl, substituted by 1-5 R². In one class of this embodiment, R¹ is quinoxalinyl, wherein each ring is unsubstituted or substituted by 1-5 R². In one class of this embodiment, R¹ is quinoxalinyl, which is unsubstituted. In one class of this embodiment, R¹ is quinoxalinyl, substituted by 1-5 R². In one class of this embodiment, R¹ is quinazolinyl, wherein each ring is unsubstituted or substituted by 1-5 R². In one class of this embodiment, R¹ is quinazolinyl, which is unsubstituted. In one class of this embodiment, R¹ is quinazolinyl, substituted by 1-5 R². In one class of this embodiment, R¹ is phthalazinyl, wherein each ring is unsubstituted or substituted by 1-5 R². In one class of this embodiment, R¹ is phthalazinyl, which is unsubstituted. In one class of this embodiment, R¹ is phthalazinyl, substituted by 1-5 R².

In one embodiment, R¹ is

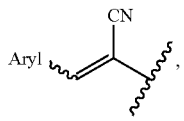

wherein the aryl is a (C₆₋₁₀)aryl, and wherein the aryl is unsubstituted or substituted by 1-5 R².

In one class of this embodiment, the cellulose ester has a degree of substitution for 2EH ("$DS_{2EH}$") that is from 0.1 to 1.0. In one subclass of this class, the cellulose ester has a degree of substitution for ChCO ("$DS_{ChCO}$") that is from 0.5 to 1.5.

In one class of this embodiment, the cellulose ester has a degree of substitution for 2EH ("$DS_{2EH}$") that is from 0.3 to 0.5. In one subclass of this class, the cellulose ester has a degree of substitution for ChCO ("$DS_{ChCO}$") that is from 0.5 to 1.5.

In one class of this embodiment, the cellulose ester has a degree of substitution for 2EH ("$DS_{2EH}$") that is from 0.2 to 0.6, a degree of substitution for OH ("$DS_{OH}$") that is less than 0.7, and a degree of substitution for the Akacyl ("$DS_{Akacyl}$") that is from 1.0 to 1.5.

In one class of this embodiment, the aryl is unsubstituted. In one class of this embodiment, the aryl is substituted by 1-5 R². In one class of this embodiment, aryl is phenyl or naphthyl, unsubstituted or substituted by 1-5 R². In one class of this embodiment, aryl is phenyl or naphthyl, wherein each ring is unsubstituted. In one class of this embodiment, aryl is phenyl or naphthyl, substituted by 1-5 R². In one class of this embodiment, aryl is phenyl, unsubstituted or substituted by 1-5 R². In one class of this embodiment, aryl is phenyl, unsubstituted. In one class of this embodiment, aryl is phenyl, substituted by 1-5 R².

In one embodiment, R¹ is

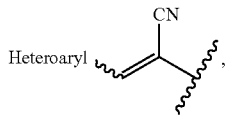

wherein the heteroaryl is a 5- to 10-membered ring having 1-4 heteroatoms chosen from N, O or S, and wherein the heteroaryl is unsubstituted or substituted by 1-5 R².

In one class of this embodiment, the cellulose ester has a degree of substitution for 2EH ("$DS_{2EH}$") that is from 0.1 to 1.0. In one subclass of this class, the cellulose ester has a degree of substitution for ChCO ("$DS_{ChCO}$") that is from 0.5 to 1.5.

In one class of this embodiment, the cellulose ester has a degree of substitution for 2EH ("DS2EH") that is from 0.3 to 0.5. In one subclass of this class, the cellulose ester has a degree of substitution for ChCO ("$DS_{ChCO}$") that is from 0.5 to 1.5.

In one class of this embodiment, the cellulose ester has a degree of substitution for 2EH ("$DS_{2EH}$") that is from 0.2 to 0.6, a degree of substitution for OH ("$DS_{OH}$") that is less than 0.7, and a degree of substitution for the Akacyl ("$DS_{Akacyl}$") that is from 1.0 to 1.5.

In one class of this embodiment, the heteroaryl is unsubstituted. In one class of this embodiment, the heteroaryl is substituted by 1-5 R². In one class of this embodiment, R¹ is furanyl, benzothiophen-yl, pyrrolyl, thiophen-yl, pyridinyl, pyrazinyl, pyridazinyl, pyrimidinyl, quinolinyl, isoquinolinyl, quinoxalinyl, quinazolinyl, or phthalazinyl, which is unsubstituted or substituted by 1-5 R². In one class of this embodiment, R¹ is furanyl, benzothiophen-yl, pyrrolyl, thiophen-yl, pyridinyl, pyrazinyl, pyridazinyl, pyrimidinyl, quinolinyl, isoquinolinyl, quinoxalinyl, quinazolinyl, or phthalazinyl, wherein each ring is unsubstituted. In one class of this embodiment, R¹ is furanyl, benzothiophen-yl, pyrrolyl, thiophen-yl, pyridinyl, pyrazinyl, pyridazinyl, pyrimidinyl, quinolinyl, isoquinolinyl, quinoxalinyl, quinazolinyl, or phthalazinyl, wherein each ring is substituted by 1-5 R². In one class of this embodiment, R¹ is furanyl, benzothiophen-yl, pyrrolyl, or thiofuranyl, wherein each ring is unsubstituted or substituted by 1-5 R². In one class of this embodiment, R¹ is furanyl, benzothiophen-yl, pyrrolyl, or thiofuranyl, wherein each ring is unsubstituted. In one class of this embodiment, R¹ is furanyl, benzothiophen-yl, pyrrolyl, or thiofuranyl, wherein each ring is substituted by 1-5 R². In one class of this embodiment, R¹ is furanyl, unsubstituted or substituted by 1-5 R². In one class of this embodiment, R¹ is furanyl, unsubstituted. In one class of this embodiment, R¹ is furanyl, substituted by 1-5 R². In one class of this embodiment, R¹ is benzothiophen-yl, unsubstituted or substituted by 1-5 R². In one class of this embodiment, R¹ is benzothiophen-yl, which is unsubstituted. In one class of this embodiment, R¹ is benzothiophen-yl, substituted by 1-5 R². In one class of this embodiment, R¹ is pyrrolyl, unsubstituted or substituted by 1-5 R². In one class of this embodiment, R¹ is pyrrolyl, which is unsubstituted. In one class of this embodiment, R¹ is pyrrolyl, substituted by 1-5 R². In one class of this embodiment, R¹ is thiophen-yl, unsubstituted or substituted by 1-5 R². In one class of this embodiment, R¹ is thiophen-yl, unsubstituted. In one class of this embodiment, R¹ is thiophen-yl, substituted by 1-5 R². In one class of this embodiment, R¹ is pyridinyl, unsubstituted or substituted by 1-5 R². In one class of this embodiment, R¹ is pyridinyl, which is unsubstituted. In one class of this embodiment, R¹ is pyridinyl, substituted by 1-5 R². In one class of this embodiment, R¹ is pyrazinyl, unsubstituted or substituted by 1-5 R². In one class of this embodiment, R¹ is pyrazinyl, which is unsubstituted. In one class of this embodiment, R¹ is pyrazinyl, substituted by 1-5 R². In one class of this embodiment, R¹ is pyridazinyl, unsubstituted or substituted by 1-5 R². In one class of this embodiment, R¹ is pyridazinyl, which is unsubstituted. In one class of this embodiment, R¹ is pyridazinyl, substituted by 1-5 R². In one class of this embodiment, R¹ is pyrimidinyl, unsubstituted or substituted by 1-5 R². In one class of this embodiment, R¹ is pyrimidinyl, unsubstituted. In one class of this embodiment, $R^1$ is pyrimidinyl, substituted by 1-5 $R^2$. In one class of this embodiment, $R^1$ is quinolinyl, unsubstituted or substituted by 1-5 $R^2$. In one class of this embodiment, $R^1$ is quinolinyl, which is unsubstituted. In one class of this embodiment, $R^1$ is quinolinyl, substituted by 1-5 $R^2$. In one class of this embodiment, $R^1$ is isoquinolinyl, unsubstituted or substituted by 1-5 $R^2$. In one class of this embodiment, $R^1$ is isoquinolinyl, unsubstituted. In one class of this embodiment, $R^1$ is isoquinolinyl, substituted by 1-5 $R^2$. In one class of this embodiment, $R^1$ is quinoxalinyl, unsubstituted or substituted by 1-5 $R^2$. In one class of this embodiment, $R^1$ is quinoxalinyl, which is unsubstituted. In one class of this embodiment, $R^1$ is quinoxalinyl, substituted by 1-5 $R^2$. In one class of this embodiment, $R^1$ is quinazolinyl, unsubstituted or substituted by 1-5 $R^2$. In one class of this embodiment, $R^1$ is quinazolinyl, which is unsubstituted. In one class of this embodiment, $R^1$ is quinazolinyl, substituted by 1-5 $R^2$. In one class of this embodiment, $R^1$ is phthalazinyl, unsubstituted or substituted by 1-5 $R^2$. In one class of this embodiment, $R^1$ is phthalazinyl, unsubstituted. In one class of this embodiment, $R^1$ is phthalazinyl, substituted by 1-5 $R^2$. In one embodiment, $R^1$ is naphthyl, benzothiophen-yl, furanyl, or

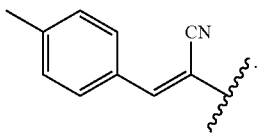 [SMILES: */C(C#N)=C/c1ccc(C)cc1]

In one embodiment, $R^1$ is naphthyl, furanyl, or

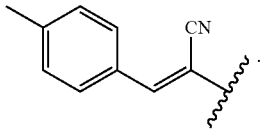 [SMILES: */C(C#N)=C/c1ccc(C)cc1]

In one embodiment, the cellulose ester has a degree of substitution for hydroxy ("$DS_{OH}$") substituents that is not greater than 1.0. In one class of this embodiment, the $DS_{OH}$ is not greater than 0.95. In one class of this embodiment, the DSH is not greater than 0.90. In one class of this embodiment, the $DS_{OH}$ is not greater than 0.85. In one class of this embodiment, the $DS_{OH}$ is not greater than 0.80. In one class of this embodiment, the $DS_{OH}$ is not greater than 0.75. In one class of this embodiment, the $DS_{OH}$ is not greater than 0.70.

In one embodiment, the cellulose ester has a degree of substitution for 2EH ("$DS_{2EH}$") that is from 0.1 to 1.0. In one class of this embodiment, the $DS_{2EH}$ is from 0.1 to 0.5. In one class of this embodiment, the $DS_{2EH}$ is from 0.5 to 1.0. In one class of this embodiment, the $DS_{2EH}$ is from 0.3 to 0.8. In one class of this embodiment, the $DS_{2EH}$ is from 0.3 to 0.5.

In one embodiment, the cellulose ester has a degree of substitution for $R^1$—CO— ("$DS_{ChCO}$") that is from 0.5 to 1.5. In one class of this embodiment, the $DS_{ChCO}$ is from 0.6 to 1.5. In one class of this embodiment, the $DS_{ChCO}$ is from 0.7 to 1.5. In one class of this embodiment, the $DS_{ChCO}$ is from 0.8 to 1.5. In one class of this embodiment, the $DS_{ChCO}$ is from 0.9 to 1.5. In one class of this embodiment, the $DS_{ChCO}$ is from 1.0 to 1.5. In one class of this embodiment, the $DS_{ChCO}$ is from 0.7 to 1.4. In one class of this embodiment, the $DS_{ChCO}$ is from 0.5 to 1.0.

In one embodiment, the cellulose ester has a degree of substitution for 2EH ("$DS_{2EH}$") that is from 0.2 to 0.6, the cellulose ester has a degree of substitution for hydroxyl ("$DS_{OH}$") that is less than 0.7, the cellulose ester has a degree of substitution for the Akacyl ("$DS_{Akacyl}$") that is from 1.0 to 1.5.

In one embodiment, the cellulose ester has a glass transition temperature ("$T_g$") that is less than 170° C. as determined according to ASTM E1356-03. In one embodiment, the cellulose ester has a glass transition temperature ("$T_g$") that is less than 165° C. as determined according to ASTM E1356-03. In one embodiment, the cellulose ester has a glass transition temperature ("$T_g$") that is less than 160° C. as determined according to ASTM E1356-03.

In one embodiment, the cellulose ester has a break strain that is greater than 3% as determined according to ASTM D882-18. In one embodiment, the cellulose ester has a break strain that is greater than 3.5% as determined according to ASTM D882-18. In one embodiment, the cellulose ester has a break strain that is greater than 4% as determined according to ASTM D882-18. In one embodiment, the cellulose ester has a break strain that is greater than 4.5% as determined according to ASTM D882-18. In one embodiment, the cellulose ester has a break strain that is greater than 5% as determined according to ASTM D882-18.

Regioselectively Substituted Composition

The present application also discloses a regioselectively substituted cellulose ester comprising:

(i) a plurality of 2-ethylhexanoyl ("2EH") substituents, wherein the cellulose ester has a degree of substitution for the 2EH ("$DS_{2EH}$") of from 0.1 to 1.0;

(ii) a plurality of ($C_{1-6}$)alkyl-CO— ("AkCO") substituents, wherein the cellulose ester has a degree of substitution for AkCO ("$DS_{AkCO}$") of from 1.0 to 1.5;

(iii) a plurality of hydroxy ("OH") substituents, wherein the cellulose ester has a degree of substitution for OH ("$DS_{OH}$") less than 0.8;

(iv) a plurality of $R^1$—CO— ("ChCO") substituents, wherein the cellulose ester has a degree of substitution for ChCO ("$DS_{ChCO}$") of from 0.5 to 1.5, wherein:

$R^1$ is (1) an ($C_{10-20}$)aryl, wherein the aryl is unsubstituted or substituted by 1-5 $R^2$, (2) a 5-10 membered heteroaryl having 1 to 4 heteroatoms chosen from N, O, or S, wherein heteroaryl is unsubstituted or substituted by 1-5 $R^2$, (3)

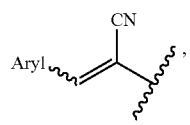

wherein the aryl is a (C$_{1-6}$)aryl, and wherein the aryl is unsubstituted or substituted by 1-5 R$^2$; or (4)

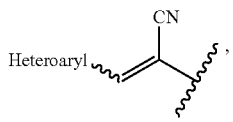

wherein the heteroaryl is a 5- to 10-membered ring having 1-4 heteroatoms chosen from N, O or S, and wherein the heteroaryl is unsubstituted or substituted by 1-5 R$^2$, each R$^2$ is independently chosen from nitro, cyano, (C$_{1-6}$)alkyl, halo(C$_{1-6}$)alkyl; (C$_{6-20}$)aryl-CO$_2$—, (C$_{6-20}$)aryl, (C$_{1-6}$)alkoxyl, halo(C$_{1-6}$)alkyoxyl, halo, 5-10 membered heteroaryl having 1-4 heteroatoms chosen from N, O, or S, or

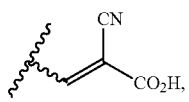

wherein the cellulose ester has a degree of substitution of the AkCO substituent at the C2 position ("C2DS$_{AkCO}$") in the range of from 0.2 to 0.3, a degree of substitution of AkCO substituent at the C3 position ("C3DS$_{AkCO}$") in the range of from 0.2 to 0.4, and a degree of substitution of AkCO substituent at the C6 position ("C6DS$_{AkCO}$") in the range of from 0.5 to 0.7.

In one embodiment, Akacyl is acetyl, propyl, butyryl, isobutyryl, pentanoyl, 3-methylbutanoyl, 2-methylbutanoyl, hexanoyl, 2-methylpentanoyl, 3-methylpentanoyl, or 4-methylpentanoyl. In one class of this embodiment, Akacyl is acetyl. In one class of this embodiment, Akacyl is propyl. In one class of this embodiment, Akacyl is butyryl. In one class of this embodiment, Akacyl is isobutyryl. In one class of this embodiment, Akacyl is pentanoyl. In one class of this embodiment, Akacyl is 3-methylbutanoyl. In one class of this embodiment, Akacyl is 2-methylbutanoyl. In one class of this embodiment, Akacyl is hexanoyl. In one class of this embodiment, Akacyl is 2-methylpentanoyl. In one class of this embodiment, Akacyl is 3-methylpentanoyl. In one class of this embodiment, Akacyl is 4-methylpentanoyl.

In one embodiment, Akacyl is acetyl, propyl, butyryl, or isobutyryl.

In one embodiment, R$^1$ is an (C$_{10-20}$)aryl, wherein the aryl is unsubstituted or substituted by 1-5 R$^2$.

In one class of this embodiment, the cellulose ester has a degree of substitution for 2EH ("DS$_{2EH}$") that is from 0.1 to 1.0. In one subclass of this class, the cellulose ester has a degree of substitution for ChCO ("DS$_{ChCO}$") that is from 0.5 to 1.5.

In one class of this embodiment, the cellulose ester has a degree of substitution for 2EH ("DS$_{2EH}$") that is from 0.3 to 0.5. In one subclass of this class, the cellulose ester has a degree of substitution for ChCO ("DS$_{ChCO}$") that is from 0.5 to 1.5.

In one class of this embodiment, the cellulose ester has a degree of substitution for 2EH ("DS$_{2EH}$") that is from 0.2 to 0.6, a degree of substitution for OH ("DS$_{OH}$") that is less than 0.7, and a degree of substitution for the Akacyl ("DS$_{Akacyl}$") that is from 1.0 to 1.5.

In one class of this embodiment, R$^1$ is naphthyl, which is unsubstituted or substituted by 1-5 R$^2$. In one class of this embodiment, R$^1$ is naphthyl, which is unsubstituted. In one class of this embodiment, R$^1$ is naphthyl, which is substituted by 1-5 R$^2$. In one embodiment, R$^1$ is an (C$_{10-20}$)aryl, wherein the aryl is unsubstituted. In one embodiment, R$^1$ is an (C$_{10-20}$)aryl, wherein the aryl is substituted by 1-5 R$^2$.

In one embodiment, R$^1$ is a 5-10 membered heteroaryl having 1 to 4 heteroatoms chosen from N, O, or S, wherein the heteroaryl is unsubstituted or substituted by 1-5 R$^2$.

In one class of this embodiment, the cellulose ester has a degree of substitution for 2EH ("DS$_{2EH}$") that is from 0.1 to 1.0. In one subclass of this class, the cellulose ester has a degree of substitution for ChCO ("DS$_{ChCO}$") that is from 0.5 to 1.5.

In one class of this embodiment, the cellulose ester has a degree of substitution for 2EH ("DS$_{2EH}$") that is from 0.3 to 0.5. In one subclass of this class, the cellulose ester has a degree of substitution for ChCO ("DS$_{ChCO}$") that is from 0.5 to 1.5.

In one class of this embodiment, the cellulose ester has a degree of substitution for 2EH ("DS$_{2EH}$") that is from 0.2 to 0.6, a degree of substitution for OH ("DS$_{OH}$") that is less than 0.7, and a degree of substitution for the Akacyl ("DS$_{Akacyl}$") that is from 1.0 to 1.5.

In one class of this embodiment, R$^1$ is furanyl, benzothiophen-yl

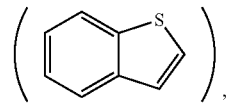

pyrrolyl, thiophen-yl

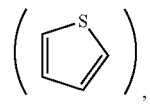

pyridinyl, pyrazinyl, pyridazinyl, pyrimidinyl, quinolinyl, isoquinolinyl, quinoxalinyl, quinazolinyl, or phthalazinyl, which is unsubstituted or substituted by 1-5 R$^2$. In one class of this embodiment, R$^1$ is furanyl, benzothiophen-yl, pyrrolyl, thiophen-yl, pyridinyl, pyrazinyl, pyridazinyl, pyrimidinyl, quinolinyl, isoquinolinyl, quinoxalinyl, quinazolinyl, or phthalazinyl, wherein each ring is unsubstituted. In one class of this embodiment, R$^1$ is furanyl, benzothiophen-yl, pyrrolyl, thiophen-yl, pyridinyl, pyrazinyl, pyridazinyl, pyrimidinyl, quinolinyl, isoquinolinyl, quinoxalinyl, quinazolinyl, or phthalazinyl, wherein each ring is substituted by 1-5 R$^2$. In one class of this embodiment, R$^1$ is furanyl, pyrrolyl, benzothiophen-yl, or thiofuranyl, wherein each ring is substituted by 1-5 R$^2$. In one class of this embodiment, R$^1$ is furanyl, pyrrolyl, benzothiophen-yl, or thiofuranyl, wherein each ring is unsubstituted. In one class of this embodiment, R$^1$ is furanyl, pyrrolyl, benzothiophen-yl, or thiofuranyl, wherein each ring is substituted by 1-5 R$^2$. In one class of this embodiment, R$^1$ is furanyl, wherein each ring is substituted by 1-5 R$^2$. In one class of this embodiment, R$^1$ is furanyl, which is unsubstituted. In one class of this embodiment, R$^1$ is furanyl, substituted by 1-5 R$^2$. In one class of this embodiment, R$^1$ is benzothiophen-yl, wherein each ring is unsubstituted or substituted by 1-5 R$^2$. In one class of this embodiment, R¹ is benzothiophen-yl, which is unsubstituted. In one class of this embodiment, R¹ is benzothiophen-yl, substituted by 1-5 R². In one class of this embodiment, R¹ is pyrrolyl, wherein each ring is unsubstituted or substituted by 1-5 R². In one class of this embodiment, R¹ is pyrrolyl, which is unsubstituted. In one class of this embodiment, R¹ is pyrrolyl, substituted by 1-5 R². In one class of this embodiment, R¹ is thiophenyl, wherein each ring is unsubstituted or substituted by 1-5 R². In one class of this embodiment, R¹ is thiophenyl, which is unsubstituted. In one class of this embodiment, R¹ is thiophenyl, substituted by 1-5 R². In one class of this embodiment, R¹ is pyridinyl, wherein each ring is unsubstituted or substituted by 1-5 R². In one class of this embodiment, R¹ is pyridinyl, which is unsubstituted. In one class of this embodiment, R¹ is pyridinyl, substituted by 1-5 R². In one class of this embodiment, R¹ is pyrazinyl, wherein each ring is unsubstituted or substituted by 1-5 R². In one class of this embodiment, R¹ is pyrazinyl, which is unsubstituted. In one class of this embodiment, R¹ is pyrazinyl, substituted by 1-5 R². In one class of this embodiment, R¹ is pyridazinyl, wherein each ring is unsubstituted or substituted by 1-5 R². In one class of this embodiment, R¹ is pyridazinyl, which is unsubstituted. In one class of this embodiment, R¹ is pyridazinyl, substituted by 1-5 R². In one class of this embodiment, R¹ is pyrimidinyl, wherein each ring is unsubstituted or substituted by 1-5 R². In one class of this embodiment, R¹ is pyrimidinyl, which is unsubstituted. In one class of this embodiment, R¹ is pyrimidinyl, substituted by 1-5 R². In one class of this embodiment, R¹ is quinolinyl, wherein each ring is unsubstituted or substituted by 1-5 R². In one class of this embodiment, R¹ is quinolinyl, which is unsubstituted. In one class of this embodiment, R¹ is quinolinyl, substituted by 1-5 R². In one class of this embodiment, R¹ is isoquinolinyl, wherein each ring is unsubstituted or substituted by 1-5 R². In one class of this embodiment, R¹ is isoquinolinyl, which is unsubstituted. In one class of this embodiment, R¹ is isoquinolinyl, substituted by 1-5 R². In one class of this embodiment, R¹ is quinoxalinyl, wherein each ring is unsubstituted or substituted by 1-5 R². In one class of this embodiment, R¹ is quinoxalinyl, which is unsubstituted. In one class of this embodiment, R¹ is quinoxalinyl, substituted by 1-5 R². In one class of this embodiment, R¹ is quinazolinyl, wherein each ring is unsubstituted or substituted by 1-5 R². In one class of this embodiment, R¹ is quinazolinyl, which is unsubstituted. In one class of this embodiment, R¹ is quinazolinyl, substituted by 1-5 R². In one class of this embodiment, R¹ is phthalazinyl, wherein each ring is unsubstituted or substituted by 1-5 R². In one class of this embodiment, R¹ is phthalazinyl, which is unsubstituted. In one class of this embodiment, R¹ is phthalazinyl, substituted by 1-5 R².

In one embodiment, R¹ is

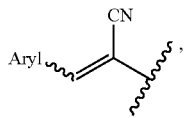

wherein the aryl is a (C₆₋₁₀)aryl, and wherein the aryl is unsubstituted or substituted by 1-5 R².

In one class of this embodiment, the cellulose ester has a degree of substitution for 2EH ("$DS_{2EH}$") that is from 0.1 to 1.0. In one subclass of this class, the cellulose ester has a degree of substitution for ChCO ("$DS_{ChCO}$") that is from 0.5 to 1.5.

In one class of this embodiment, the cellulose ester has a degree of substitution for 2EH ("$DS_{2EH}$") that is from 0.3 to 0.5. In one subclass of this class, the cellulose ester has a degree of substitution for ChCO ("$DS_{ChCO}$") that is from 0.5 to 1.5.

In one class of this embodiment, the cellulose ester has a degree of substitution for 2EH ("$DS_{2EH}$") that is from 0.2 to 0.6, a degree of substitution for OH ("$DS_{OH}$") that is less than 0.7, and a degree of substitution for the Akacyl ("$DS_{Akacyl}$") that is from 1.0 to 1.5.

In one class of this embodiment, the aryl is unsubstituted. In one class of this embodiment, the aryl is substituted by 1-5 R². In one class of this embodiment, aryl is phenyl or naphthyl, unsubstituted or substituted by 1-5 R². In one class of this embodiment, aryl is phenyl or naphthyl, wherein each ring is unsubstituted. In one class of this embodiment, aryl is phenyl or naphthyl, substituted by 1-5 R². In one class of this embodiment, aryl is phenyl, unsubstituted or substituted by 1-5 R². In one class of this embodiment, aryl is phenyl, unsubstituted. In one class of this embodiment, aryl is phenyl, substituted by 1-5 R².

In one embodiment, R¹ is

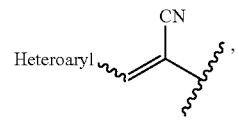

wherein the heteroaryl is a 5- to 10-membered ring having 1-4 heteroatoms chosen from N, O or S, and wherein the heteroaryl is unsubstituted or substituted by 1-5 R².

In one class of this embodiment, the cellulose ester has a degree of substitution for 2EH ("$DS_{2EH}$") that is from 0.1 to 1.0. In one subclass of this class, the cellulose ester has a degree of substitution for ChCO ("$DS_{ChCO}$") that is from 0.5 to 1.5.

In one class of this embodiment, the cellulose ester has a degree of substitution for 2EH ("$DS_{2EH}$") that is from 0.3 to 0.5. In one subclass of this class, the cellulose ester has a degree of substitution for ChCO ("$DS_{ChCO}$") that is from 0.5 to 1.5.

In one class of this embodiment, the cellulose ester has a degree of substitution for 2EH ("$DS_{2EH}$") that is from 0.2 to 0.6, a degree of substitution for OH ("$DS_{OH}$") that is less than 0.7, and a degree of substitution for the Akacyl ("$DS_{Akacyl}$") that is from 1.0 to 1.5.

In one class of this embodiment, the heteroaryl is unsubstituted. In one class of this embodiment, the heteroaryl is substituted by 1-5 R². In one class of this embodiment, R¹ is furanyl, benzothiophen-yl, pyrrolyl, thiophen-yl, pyridinyl, pyrazinyl, pyridazinyl, pyrimidinyl, quinolinyl, isoquinolinyl, quinoxalinyl, quinazolinyl, or phthalazinyl, which is unsubstituted or substituted by 1-5 R². In one class of this embodiment, R¹ is furanyl, benzothiophen-yl, pyrrolyl, thiophen-yl, pyridinyl, pyrazinyl, pyridazinyl, pyrimidinyl, quinolinyl, isoquinolinyl, quinoxalinyl, quinazolinyl, or phthalazinyl, wherein each ring is unsubstituted. In one class of this embodiment, R¹ is furanyl, benzothiophen-yl, pyrrolyl, thiophen-yl, pyridinyl, pyrazinyl, pyridazinyl, pyrimidinyl, quinolinyl, isoquinolinyl, quinoxalinyl, quinazolinyl, or phthalazinyl, wherein each ring is substituted by 1-5 R². In one class of this embodiment, R¹ is furanyl, benzothiophen-yl, pyrrolyl, or thiofuranyl, wherein each ring is unsubstituted or substituted by 1-5 $R^2$. In one class of this embodiment, $R^1$ is furanyl, benzothiophen-yl, pyrrolyl, or thiofuranyl, wherein each ring is unsubstituted. In one class of this embodiment, $R^1$ is furanyl, benzothiophen-yl, pyrrolyl, or thiofuranyl, wherein each ring is substituted by 1-5 $R^2$. In one class of this embodiment, $R^1$ is furanyl, unsubstituted or substituted by 1-5 $R^2$. In one class of this embodiment, $R^1$ is furanyl, unsubstituted. In one class of this embodiment, $R^1$ is furanyl, substituted by 1-5 $R^2$. In one class of this embodiment, $R^1$ is benzothiophen-yl, unsubstituted or substituted by 1-5 $R^2$. In one class of this embodiment, $R^1$ is benzothiophen-yl, which is unsubstituted. In one class of this embodiment, $R^1$ is benzothiophen-yl, substituted by 1-5 $R^2$. In one class of this embodiment, $R^1$ is pyrrolyl, unsubstituted or substituted by 1-5 $R^2$. In one class of this embodiment, $R^1$ is pyrrolyl, which is unsubstituted. In one class of this embodiment, $R^1$ is pyrrolyl, substituted by 1-5 $R^2$. In one class of this embodiment, $R^1$ is thiophen-yl, unsubstituted or substituted by 1-5 $R^2$. In one class of this embodiment, $R^1$ is thiophen-yl, unsubstituted. In one class of this embodiment, $R^1$ is thiophen-yl, substituted by 1-5 $R^2$. In one class of this embodiment, $R^1$ is pyridinyl, unsubstituted or substituted by 1-5 $R^2$. In one class of this embodiment, $R^1$ is pyridinyl, which is unsubstituted. In one class of this embodiment, $R^1$ is pyridinyl, substituted by 1-5 $R^2$. In one class of this embodiment, $R^1$ is pyrazinyl, unsubstituted or substituted by 1-5 $R^2$. In one class of this embodiment, $R^1$ is pyrazinyl, which is unsubstituted. In one class of this embodiment, $R^1$ is pyrazinyl, substituted by 1-5 $R^2$. In one class of this embodiment, $R^1$ is pyridazinyl, unsubstituted or substituted by 1-5 $R^2$. In one class of this embodiment, $R^1$ is pyridazinyl, which is unsubstituted. In one class of this embodiment, $R^1$ is pyridazinyl, substituted by 1-5 $R^2$. In one class of this embodiment, $R^1$ is pyrimidinyl, unsubstituted or substituted by 1-5 $R^2$. In one class of this embodiment, $R^1$ is pyrimidinyl, unsubstituted. In one class of this embodiment, $R^1$ is pyrimidinyl, substituted by 1-5 $R^2$. In one class of this embodiment, $R^1$ is quinolinyl, unsubstituted or substituted by 1-5 $R^2$. In one class of this embodiment, $R^1$ is quinolinyl, which is unsubstituted. In one class of this embodiment, $R^1$ is quinolinyl, substituted by 1-5 $R^2$. In one class of this embodiment, $R^1$ is isoquinolinyl, unsubstituted or substituted by 1-5 $R^2$. In one class of this embodiment, $R^1$ is isoquinolinyl, unsubstituted. In one class of this embodiment, $R^1$ is isoquinolinyl, substituted by 1-5 $R^2$. In one class of this embodiment, $R^1$ is quinoxalinyl, unsubstituted or substituted by 1-5 $R^2$. In one class of this embodiment, $R^1$ is quinoxalinyl, which is unsubstituted. In one class of this embodiment, $R^1$ is quinoxalinyl, substituted by 1-5 $R^2$. In one class of this embodiment, $R^1$ is quinazolinyl, unsubstituted or substituted by 1-5 $R^2$. In one class of this embodiment, $R^1$ is quinazolinyl, which is unsubstituted. In one class of this embodiment, $R^1$ is quinazolinyl, substituted by 1-5 $R^2$. In one class of this embodiment, $R^1$ is phthalazinyl, unsubstituted or substituted by 1-5 $R^2$. In one class of this embodiment, $R^1$ is phthalazinyl, unsubstituted. In one class of this embodiment, $R^1$ is phthalazinyl, substituted by 1-5 $R^2$. In one embodiment, $R^1$ is naphthyl, benzothiophen-yl, furanyl, or

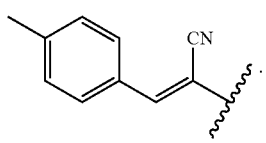 [SMILES: */C(C#N)=C/c1ccc(C)cc1]

In one embodiment, $R^1$ is naphthyl, furanyl, or

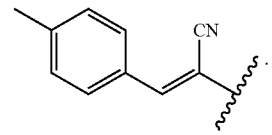 [SMILES: */C(C#N)=C/c1ccc(C)cc1]

In one embodiment, the regioselectively substituted cellulose ester has a degree of substitution of the 2EH substituent at the C2 position ("C2DS$_{2EH}$") that is less than 0.1, a degree of substitution of the 2EH substituent at the C3 position ("C3DS$_{2EH}$") that is less than 0.1, and a degree of substitution of the 2EH substituent at the C6 position ("C6DS$_{2EH}$") that is in the range of from 0.15 to 0.40. In one class of this embodiment, the C6DS$_{2EH}$ is greater than the sum of C2DS$_{2EH}$ and C3DS$_{2EH}$.

In one embodiment, the cellulose ester has a degree of substitution for hydroxy ("DS$_{OH}$") substituents that is not greater than 1.0. In one class of this embodiment, the DS$_{OH}$ is not greater than 0.95. In one class of this embodiment, the DSH is not greater than 0.90. In one class of this embodiment, the DS$_{OH}$ is not greater than 0.85. In one class of this embodiment, the DS$_{OH}$ is not greater than 0.80. In one class of this embodiment, the DS$_{OH}$ is not greater than 0.75. In one class of this embodiment, the DS$_{OH}$ is not greater than 0.70.

In one embodiment, the cellulose ester has a degree of substitution for 2EH ("DS$_{2EH}$") that is from 0.1 to 1.0. In one class of this embodiment, the DS$_{2EH}$ is from 0.1 to 0.5. In one class of this embodiment, the DS$_{2EH}$ is from 0.5 to 1.0. In one class of this embodiment, the DS$_{2EH}$ is from 0.3 to 0.8. In one class of this embodiment, the DS$_{2EH}$ is from 0.3 to 0.5.

In one embodiment, the cellulose ester has a degree of substitution for $R^1$—CO— ("DS$_{ChCO}$") that is from 0.5 to 1.5. In one class of this embodiment, the DS$_{ChCO}$ is from 0.6 to 1.5. In one class of this embodiment, the DS$_{ChCO}$ is from 0.7 to 1.5. In one class of this embodiment, the DS$_{ChCO}$ is from 0.8 to 1.5. In one class of this embodiment, the DS$_{ChCO}$ is from 0.9 to 1.5. In one class of this embodiment, the DS$_{ChCO}$ is from 1.0 to 1.5. In one class of this embodiment, the DS$_{ChCO}$ is from 0.7 to 1.4. In one class of this embodiment, the DS$_{ChCO}$ is from 0.5 to 1.0.

In one embodiment, the cellulose ester has a degree of substitution for 2EH ("DS$_{2EH}$") that is from 0.2 to 0.6, the cellulose ester has a degree of substitution for hydroxyl ("DS$_{OH}$") that is less than 0.7, the cellulose ester has a degree of substitution for the Akacyl ("DS$_{Akacyl}$") that is from 1.0 to 1.5.

In one embodiment, the cellulose ester has a glass transition temperature ("T$_g$") that is less than 170° C. as determined according to ASTM E1356-03. In one embodiment, the cellulose ester has a glass transition temperature ("T$_g$") that is less than 165° C. as determined according to ASTM E1356-03. In one embodiment, the cellulose ester has a glass transition temperature ("T$_g$") that is less than 160° C. as determined according to ASTM E1356-03.

In one embodiment, the cellulose ester has a break strain that is greater than 3% as determined according to ASTM D882-18. In one embodiment, the cellulose ester has a break strain that is greater than 3.5% as determined according to ASTM D882-18. In one embodiment, the cellulose ester has a break strain that is greater than 4% as determined according to ASTM D882-18. In one embodiment, the cellulose ester has a break strain that is greater than 4.5% as determined according to ASTM D882-18. In one embodiment, the cellulose ester has a break strain that is greater than 5% as determined according to ASTM D882-18.

The present application discloses a regioselectively substituted cellulose ester comprising: (i) a plurality of 2-ethylhexanoyl ("2EH") substituents, wherein the cellulose ester has a degree of substitution for the 2EH ("$DS_{2EH}$") of from 0.1 to 1.0; (ii) a plurality of ($C_{1-6}$)alkyl-CO— ("AkCO") substituents, wherein the cellulose ester has a degree of substitution for AkCO ("$DS_{AkCO}$") of from 1.0 to 1.5; (iii) a plurality of hydroxy ("OH") substituents, wherein the cellulose ester has a degree of substitution for OH ("$DS_{OH}$") less than 0.8; (iv) a plurality of $R^1$CO— ("ChCO") substituents, wherein the cellulose ester has a degree of substitution for Ch ("$DS_{ChCO}$") of from 0.5 to 1.5, wherein: $R^1$ is phenyl, wherein the phenyl is unsubstituted or substituted by 1-5 $R^2$, each $R^2$ is independently chosen from nitro, cyano, ($C_1$-6) alkyl, halo($C_{1-6}$)alkyl; ($C_{6-20}$)aryl-$CO_2$—, ($C_{6-20}$)aryl, ($C_{1-6}$)alkoxyl, halo($C_1$-6)alkyoxyl, halo, 5-10 membered heteroaryl having 1-4 heteroatoms chosen from N, O, or S, or

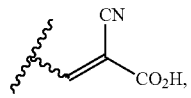

wherein the cellulose ester has a degree of substitution of the AkCO substituent at the C2 position ("$C2DS_{AkCO}$") in the range of from 0.2 to 0.3, a degree of substitution of AkCO substituent at the C3 position ("$C3DS_{AkCO}$") in the range of from 0.2 to 0.4, and a degree of substitution of AkCO substituent at the C6 position ("$C6DS_{AkCO}$") in the range of from 0.5 to 0.7.

In one embodiment, the cellulose ester has a degree of substitution for 2EH ("$DS_{2EH}$") that is from 0.1 to 1.0. In one class of this embodiment, the cellulose ester has a degree of substitution for ChCO ("$DS_{ChCO}$") that is from 0.5 to 1.5.

In one embodiment, the cellulose ester has a degree of substitution for 2EH ("$DS_{2EH}$") that is from 0.3 to 0.5. In one class of this embodiment, the cellulose ester has a degree of substitution for ChCO ("$DS_{ChCO}$") that is from 0.5 to 1.5.

In one embodiment, the cellulose ester has a degree of substitution for 2EH ("$DS_{2EH}$") that is from 0.2 to 0.6, a degree of substitution for OH ("$DS_{OH}$") that is less than 0.7, and a degree of substitution for the Akacyl ("$DS_{Akacyl}$") that is from 1.0 to 1.5.

In one embodiment, Akacyl is acetyl, propyl, butyryl, isobutyryl, pentanoyl, 3-methylbutanoyl, 2-methylbutanoyl, hexanoyl, 2-methylpentanoyl, 3-methylpentanoyl, or 4-methylpentanoyl. In one class of this embodiment, Akacyl is acetyl. In one class of this embodiment, Akacyl is propyl. In one class of this embodiment, Akacyl is butyryl. In one class of this embodiment, Akacyl is isobutyryl. In one class of this embodiment, Akacyl is pentanoyl. In one class of this embodiment, Akacyl is 3-methylbutanoyl. In one class of this embodiment, Akacyl is 2-methylbutanoyl. In one class of this embodiment, Akacyl is hexanoyl. In one class of this embodiment, Akacyl is 2-methylpentanoyl. In one class of this embodiment, Akacyl is 3-methylpentanoyl. In one class of this embodiment, Akacyl is 4-methylpentanoyl.

In one embodiment, the regioselectively substituted cellulose ester has a degree of substitution of the 2EH substituent at the C2 position ("$C2DS_{2EH}$") that is less than 0.1, a degree of substitution of the 2EH substituent at the C3 position ("$C3DS_{2EH}$") that is less than 0.1, and a degree of substitution of the 2EH substituent at the C6 position ("$C6DS_{2EH}$") that is in the range of from 0.15 to 0.40. In one class of this embodiment, the $C6DS_{2EH}$ is greater than the sum of $C2DS_{2EH}$ and $C3DS_{2EH}$.

In one embodiment, the cellulose ester has a degree of substitution for hydroxy ("$DS_{OH}$") substituents that is not greater than 1.0. In one class of this embodiment, the $DS_{OH}$ is not greater than 0.95. In one class of this embodiment, the DSH is not greater than 0.90. In one class of this embodiment, the $DS_{OH}$ is not greater than 0.85. In one class of this embodiment, the $DS_{OH}$ is not greater than 0.80. In one class of this embodiment, the $DS_{OH}$ is not greater than 0.75. In one class of this embodiment, the $DS_{OH}$ is not greater than 0.70.

In one embodiment, the cellulose ester has a degree of substitution for 2EH ("$DS_{2EH}$") that is from 0.1 to 1.0. In one class of this embodiment, the $DS_{2EH}$ is from 0.1 to 0.5. In one class of this embodiment, the $DS_{2EH}$ is from 0.5 to 1.0. In one class of this embodiment, the $DS_{2EH}$ is from 0.3 to 0.8. In one class of this embodiment, the $DS_{2EH}$ is from 0.3 to 0.5.

In one embodiment, the cellulose ester has a degree of substitution for $R^1$—CO— ("$DS_{ChCO}$") that is from 0.5 to 1.5. In one class of this embodiment, the $DS_{ChCO}$ is from 0.6 to 1.5. In one class of this embodiment, the $DS_{ChCO}$ is from 0.7 to 1.5. In one class of this embodiment, the $DS_{ChCO}$ is from 0.8 to 1.5. In one class of this embodiment, the $DS_{ChCO}$ is from 0.9 to 1.5. In one class of this embodiment, the $DS_{ChCO}$ is from 1.0 to 1.5. In one class of this embodiment, the $DS_{ChCO}$ is from 0.7 to 1.4. In one class of this embodiment, the $DS_{ChCO}$ is from 0.5 to 1.0.

In one embodiment, the cellulose ester has a degree of substitution for 2EH ("$DS_{2EH}$") that is from 0.2 to 0.6, the cellulose ester has a degree of substitution for hydroxyl ("$DS_{OH}$") that is less than 0.7, the cellulose ester has a degree of substitution for the Akacyl ("$DS_{Akacyl}$") that is from 1.0 to 1.5.

In one embodiment, the cellulose ester has a glass transition temperature ("$T_g$") that is less than 170° C. as determined according to ASTM E1356-03. In one embodiment, the cellulose ester has a glass transition temperature ("$T_g$") that is less than 165° C. as determined according to ASTM E1356-03. In one embodiment, the cellulose ester has a glass transition temperature ("$T_g$") that is less than 160° C. as determined according to ASTM E1356-03.

In one embodiment, the cellulose ester has a break strain that is greater than 3% as determined according to ASTM D882-18. In one embodiment, the cellulose ester has a break strain that is greater than 3.5% as determined according to ASTM D882-18. In one embodiment, the cellulose ester has a break strain that is greater than 4% as determined according to ASTM D882-18. In one embodiment, the cellulose ester has a break strain that is greater than 4.5% as determined according to ASTM D882-18. In one embodiment, the cellulose ester has a break strain that is greater than 5% as determined according to ASTM D882-18.

Films

The cellulose ester and regioselectively substituted cellulose ester compositions discloses in this application can be made into films.

Any of the above-described optical films can be made by solvent casting, melt extrusion, lamination, or a coating process. These procedures are generally known in the art. Examples of solvent casting, melt extrusion, lamination, and coating methods can be found, for example, in U.S. Patent Application Publication Nos. US 2009/0050842, US 2009/0054638, and US 2009/0096962, the contents of which are incorporated herein by reference. Further examples of solvent casting, melt extrusion, lamination, and coating methods to form films can be found, for example, in U.S. Pat. Nos. 4,592,885 and 7,172,713, and U.S. Patent Application Publication Nos. US 2005/0133953 and US 2010/0055356, the contents of which are incorporated herein by reference.

In order to assist in obtaining the desired optical properties of the films described herein, the films can be stretched. By adjusting the stretch conditions, such as stretch temperature, stretch type (uniaxial or biaxial), stretch ratio, pre-heat time and temperature, and post-stretch annealing time and temperature, the desired optical properties can be achieved. The precise stretching conditions may depend upon the specific composition of the cellulose ester, the amount and type of plasticizer, and the glass transition temperature of that specific composition. Hence, the specific stretching conditions can vary widely. In various embodiments, the stretching temperature can be in the range of from about 160 to about 200° C. Additionally, the stretch ratio based on 1.0 in the machine direction ("MD") can range from about 1.3 to about 2.0 in the transverse direction ("TD"). The pre-heat time can be in the range of from about 10 to about 300 seconds, and the pre-heat temperature can be the same as the stretch temperature. The post-annealing time can range from about 0 to about 300 seconds, and the post-annealing temperature can range from about 10 to about 40° C. below the stretching temperature. Film thickness may depend upon the film thickness before stretching and upon the stretching conditions. After stretching, the film thickness can be from about 1 μm to about 500 μm, from about 5 μm to about 200 μm, or from about 10 μm to about 120 μm. In one embodiment, the film is a uniaxially or biaxially stretched optical film. In one class of this embodiment, the film is a uniaxially stretched optical film. In one class of this embodiment, the film is a biaxially stretched optical film.

In one embodiment, the film is a +C film, –C film, a +A film, or a ±A film. In one class of this embodiment, the film is a +C film. In one class of this embodiment, the film is a +C film. In one class of this embodiment, the film is 25 a –C film. In one class of this embodiment, the film is a +A film. In one class of this embodiment, the film is a –A film. In one class of this embodiment, the film is a ±A film.

Examples

Abbreviations
Int is intermediate; ° C. is degree Celsius; iPrOH is isopropyl alcohol; DMSO is dimethyl sulfoxide; NMR is nuclear magnetic resonance; eq is equivalent(s); RXN is reaction; temp is temperature; wt % is weight percent; CAP 482-20 is Eastman™ CAP 482-20; h is hour(s); POH is propionic acid; AcOH is acetic acid; Pyr is pyridine; CP is cellulose propionate; CAP is cellulose acetate propionate; $DS_{OH}$ is the average degree of substitution for hydroxyl substituents; $DS_{Pr}$ is the average degree of substitution for the propionyl substituents; DMAC is dimethylacetamide; NMI is 1-methylimidazole; min is minute(s); PvCl is pivaloyl chloride; CPPv is cellulose propionate pivalate; Pv is pivaloyl or pivalate; L is liter(s); Dissoln is dissolution; wt is weight; 2EH is 2-ethylhexanoyl; 2EHCI is 2-ethylhexanoyl chloride; DS2EH is the average degree of substitution for the 2-ethylhexanoyl substituent; C2DS is the degree of substitution at the C2 position; C3DS is the degree of substitution at the C3 position; C6DS is the degree of substitution at the C6 position; CP2EHNp is cellulose propionyl 2-ethylhexanoate naphthoate; F is furyanoyl or furanoate; FCl is furanoyl chloride; TCA is (E)-2-cyano-3-(p-tolyl)acryloyl; TCACl is (E)-2-cyano-3-(p-tolyl)acryloyl chloride;

Procedures for the Synthesis of the Regioselective Cellulose Esters and Intermediates 1. Cellulose Ester Intermediates Preparation of Intermediate 1 CP: To a 4-neck 2 L jacketed flask, under nitrogen with overhead stirring and a bottom valve, was added iPrOH (418 g). The jacket was set at 50° C. To the reactor was added Eastman™ CAP 482-20 (120.1 g) through a bent funnel directing the material into the vortex. The slurry was stirred for 10 min. To the slurry was added $N_2H_4 \cdot H_2O$ (34.7 g, 1.81 eq) in AcOH (9.2 g, 0.40 eq) and DMSO (418 g). The reaction mixture was stirred for 12 h. The dope was precipitated by the addition of water to afford the product as a white solid. The solids were filtered on a glass frit and washed with copious amounts of water. The product was transferred to an aluminum pan and dried in vacuo at 60° C. for 16 hours to provide Int 1. Int 1 was analyzed by $^1$H NMR, 13C NMR to determine that the $DS_{Pr}=1.19$, $DS_{OH}=1.81$, $C2DS_{Pr}=0.27$, $C3DS_{Pr}=0.32$, $C6DS_{Pr}=0.57$.

Preparation of Intermediate 2 (CP): In a variation for the preparation of Int 1, 1.70 eq of hydrazine monohydrate was used. Pyridine replaced the iPrOH and DMSO solvents, and acetic acid was replaced with propionic acid (0.1 eq) and the reaction temperature was set at 50° C. to give Int 2: $DS_{Pr}=1.15$ and $DS_{OH}=1.85$ (as determined by 1H NMR, 13C NMR).

Table 1 provides a list of cellulose propionates synthesized along with the equivalents of $N_2H_4 \cdot H_2O$, solvent used, weight percent polymer, acid (acetic acid or propionic acid), reaction time, and reaction temperature.

TABLE 1

| Int # | Solvent | Wt % CAP 482-20 | Eq $N_2H_4 \cdot H_2O$ | Eq Acid | Rxn time (h) | Rxn temp (° C.) |
|---|---|---|---|---|---|---|
| 3 | Pyr | 9.6 | 1.60 | 0.20 (POH) | 18 | 70 |
| 4 | Pyr | 9.7 | 1.60 | 0.20 (POH) | 24 | 25 |
| 5 | Pyr | 15 | 1.60 | 0.20 (AcOH) | 19.5 | 50 |
| 6 | Pyr | 15 | 1.50 | 0.20 (POH) | 18 | 50 |
| 7 | DMSO/iPrOH | 10 | 1.90 | 0.40 (AcOH) | 24 | 40 |
| 8 | Pyr | 8.4 | 1.70 | 0.1 (POH) | 24 | 50 |
| 9 | DMSO/iPrOH | 10 | 1.83 | 0.40 (AcOH) | 20 | 43 |
| 10 | Pyr | 12.4 | 1.63 | 1.60 (POH) | 24 | 50 |
| 11 | Pyr | 13.4 | 1.60 | 1.60 (POH) | 23 | 50 |
| 12 | DMSO/iPrOH | 10 | 1.90 | 0.40 (AcOH) | 24 | 43 |

Table 2 provides the degree of substitution for the hydroxyl, and the C2, C3, and C6 degree of substitution for propionyl for Int 2-12 as determined by $^1$H and $^{13}$C NMR.

TABLE 2

| Int | $DS_{OH}$ | $C2DS_{Pr}$ | $C3DS_{Pr}$ | $C6DS_{Pr}$ |
|---|---|---|---|---|
| 2 | 1.81 | 0.27 | 0.35 | 0.60 |
| 3 | 1.89 | 0.26 | 0.27 | 0.65 |
| 4 | 1.84 | 0.26 | 0.29 | 0.62 |
| 5 | 1.90 | 0.27 | 0.28 | 0.63 |
| 6 | 1.81 | 0.26 | 0.33 | 0.64 |
| 7 | 1.86 | 0.24 | 0.28 | 0.60 |
| 8 | 1.86 | 0.26 | 0.33 | 0.62 |
| 9 | 1.81 | 0.27 | 0.32 | 0.57 |
| 10 | 1.84 | 0.28 | 0.32 | 0.65 |
| 11 | 1.87 | 0.24 | 0.31 | 0.57 |
| 12 | 1.90 | 0.23 | 0.29 | 0.58 |

Preparation of Intermediate 13 (CPPv): To a 1 L, 4-neck jacketed resin kettle reaction flask under nitrogen with overhead mechanical stirring was charged anhydrous DMAC (6.27 mol) and NMI (1.23 mol). Int 1 (0.288 mol) was added to the mixture with stirring using a bent funnel to direct the powder into the vortex. The mixture was stirred 90 min at 30° C. to afford a homogeneous mixture. To the dope was added PvCl (0.44 mol eq to Int 1) in DMAC (0.194 mol) dropwise over 25 min. The reaction mixture was stirred at 35° C. for 5 h. Int 13 was precipitated by pouring the reaction mass into 4 L of water with homogenization to afford a white solid. The solids were collected in a polypropylene weave bag and continuously washed 6 h with deionized water. The washed product while still in the closed bag was centrifuged to remove excess water and then the product was transferred to a glass crystallization dish and dried in vacuo at 55° C. overnight. The product was analyzed by $^1$H NMR and 13C NMR to determine the $DS_{Pr}$=1.19, $DS_{Pv}$=0.40, and $DS_{OH}$=1.41.

Preparation of Intermediate 14 (CPPv): In a variation to Intermediate 13, to a 1 L, 4-neck jacketed resin kettle reaction flask under nitrogen with overhead mechanical stirring was charged anhydrous DMAC (1.95 mol) and NMI (0.38 mol). To the mixture was added with stirring Int 1 (0.087 mol) using a bent funnel to direct the powder into the vortex. The mixture was stirred 7 h at 26° C. to afford a homogeneous mixture. To the dope was added neat PvCl (0.39 mol eq to Int 1) dropwise over 60 min. The reaction mixture was stirred at 26° C. for 2.5 h. The Int 14 product was precipitated by pouring the reaction mass into 2 L of water with homogenization to afford a white solid. The solids were collected in a polypropylene weave bag and continuously washed 6 h with deionized water. The washed product while still in the closed bag was centrifuged to remove excess water and then the product was transferred to a glass crystallization dish and dried in vacuo at 55° C. overnight. The product was analyzed by $^1$H NMR and 13C NMR to determine the $DS_{Pr}$=1.19, $DS_{Pv}$=0.35, and $DS_{OH}$=1.46.

Table 3 provides a list of cellulose propionate pivalate intermediates synthesized along with amounts of solvents and CP Intermediate, equivalents of PvCl, type of PvCl addition, dissolution and reaction temperature, CP dissolution time and PvCl reaction time.

TABLE 3

| Int | SM, Int 1 (mol) | DMAC (mol) | NMI (mol) | Mol Eq PvCl to CP | PvCl/DMAC wt/wt Ratio | Dissoln/Rxn Temp (° C.) | Dissoln Time (min) | Rxn Time (min) |
|---|---|---|---|---|---|---|---|---|
| 15 | 0.282 | 6.38 | 1.23 | 0.440 | 1:1 | 35 | 90 | 255 |
| 16 | 0.087 | 1.95 | 0.38 | 0.390 | 1:1 | 26 | 420 | 150 |
| 17 | 0.087 | 1.95 | 0.38 | 0.400 | 1:1 | 26 | 420 | 150 |
| 18 | 0.087 | 1.95 | 0.38 | 0.410 | 1:1 | 26 | 420 | 150 |
| 19 | 0.087 | 1.98 | 0.39 | 0.420 | 1:1 | 26 | 420 | 150 |
| 20 | 0.087 | 1.95 | 0.39 | 0.400 | neat | 26 | 420 | 150 |
| 21 | 0.087 | 1.95 | 0.39 | 0.410 | neat | 26 | 420 | 150 |
| 22 | 0.087 | 1.95 | 0.41 | 0.420 | neat | 26 | 420 | 150 |
| 23 | 0.288 | 6.28 | 1.23 | 0.480 | 1:1 | 30 | 90 | 320 |
| 24 | 0.288 | 6.28 | 1.23 | 0.440 | 1:1 | 35 | 90 | 325 |
| 25 | 0.282 | 6.22 | 1.20 | 0.450 | 1:1 | 30 | 90 | 255 |

Table 4 provides the degree of substitution for the propionyl and the pivaloyl and the degree of substitution for the 02, 03 and 06 hydroxyl groups and the total DS for Int 15-25 as determined by $^1$H and $^{13}$C NMR.

TABLE 4

| Int | $DS_{Pr}$ | $DS_{Pv}$ | C2DS | C3DS | C6DS | Total DS ($^1$H NMR) | Total DS ($^{13}$C NMR) |
|---|---|---|---|---|---|---|---|
| 15 | 1.18 | 0.40 | 0.30 | 0.34 | 0.86 | 1.58 | 1.50 |
| 16 | 1.19 | 0.37 | 0.35 | 0.38 | 0.81 | 1.56 | 1.54 |
| 17 | 1.19 | 0.40 | 0.34 | 0.38 | 0.82 | 1.59 | 1.54 |
| 18 | 1.19 | 0.36 | 0.32 | 0.33 | 0.84 | 1.55 | 1.49 |
| 19 | 1.19 | 0.38 | 0.34 | 0.38 | 0.83 | 1.57 | 1.55 |
| 20 | 1.19 | 0.39 | 0.35 | 0.40 | 0.83 | 1.58 | 1.58 |
| 21 | 1.19 | 0.36 | 0.33 | 0.32 | 0.82 | 1.55 | 1.47 |
| 22 | 1.19 | 0.38 | 0.34 | 0.35 | 0.85 | 1.57 | 1.54 |
| 23 | 1.19 | 0.45 | 0.32 | 0.37 | 0.85 | 1.64 | 1.54 |
| 24 | 1.19 | 0.38 | 0.32 | 0.35 | 0.84 | 1.57 | 1.51 |
| 25 | 1.19 | 0.39 | 0.32 | 0.37 | 0.85 | 1.58 | 1.54 |

Preparation of Intermediate 26 (CP2EH): To a 1 L, 4-neck jacketed resin kettle reaction flask under nitrogen with overhead mechanical stirring was charged anhydrous DMAC (3.48 mol) and NMI (0.36 mol). To the mixture was added with stirring Int 1 (0.087 mol) using a bent funnel to direct the powder into the vortex. The mixture was stirred 90 min at 30° C. to afford a homogeneous mixture. To the dope was added 2-ethylhexanoyl chloride (0.44 mol eq to Int 1) in DMAC (0.184 mol) dropwise over 25 minutes. The reaction mixture was stirred at 30° C. for 255 min. Int 26 was precipitated by pouring the reaction mass into 4 L of water with homogenization to afford a white solid. The solids were collected in a polypropylene weave bag and continuously washed 6 h with deionized water. The washed product while still in the closed bag was centrifuged to remove excess water and then the product was transferred to a glass crystallization dish and dried in vacuo at 55° C. overnight. The product was analyzed by $^1$H NMR and $^{13}$C NMR to determine the $DS_{Pr}$=1.18, $DS_{2EH}$=0.41, $DS_{OH}$=1.41, C2DS=0.34, C3DS=0.37 and C6DS=0.85.

Table 5 provides a list of cellulose propionate 2-ethylhexanoate intermediates synthesized along with the amounts of solvents and CP Intermediate, the equivalents of 2EHCl, the CP dissolution time and the 2EHCl reaction time.

TABLE 5

| Int | Int 1 (mol) | DMAC (mol) | NMI (mol) | Mol Eq 2EHCl to CP | Dissoln and Rxn Temp (° C.) | Dissoln Time (min) | Rxn Time (min) |
|---|---|---|---|---|---|---|---|
| 27 | 0.29 | 6.24 | 1.37 | 0.45 | 35 | 90 | 255 |
| 28 | 0.29 | 6.25 | 1.36 | 0.44 | 35 | 90 | 255 |
| 29 | 0.29 | 6.30 | 1.37 | 0.43 | 35 | 90 | 255 |

Table 6 provides the degree of substitution for the propionyl and the 2-ethylhexanoyl and the degree of substitution for the C2, C3 and C6 hydroxyl groups and the total DS for Int 27-29 as determined by $^1$H and $^{13}$C NMR.

TABLE 6

| Int | $DS_{Pr}$ | $DS_{2EH}$ | C2DS | C3DS | C6DS | Total DS ($^1$H NMR) | Total DS ($^{13}$C NMR) |
|---|---|---|---|---|---|---|---|
| 27 | 1.18 | 0.42 | 0.35 | 0.38 | 0.85 | 1.60 | 1.58 |
| 28 | 1.18 | 0.42 | 0.33 | 0.36 | 0.8 | 1.60 | 1.49 |
| 29 | 1.18 | 0.41 | 0.34 | 0.37 | 0.84 | 1.59 | 1.54 |

Preparation of Example 1 (CP2EHNp): To a dry 1 L, 4-neck resin kettle under nitrogen with mechanical stirring was added DMAC (2.30 mol) and NMI (0.37 mol). To the mixture was added Int 29 (0.071 mol) and the mixture was stirred 4 h at 40° C. to afford a dope. The dope was cooled to 25° C. and NpCl (1.41 mol eq to Int 29) in DMAC (0.31 mol) was added dropwise over 30 min. The mixture was heated to 35° C. and stirred 16 h. The dope was precipitated by pouring slowly into 2 L of $^i$POH using a high-speed homogenizer to provide turbulent mixing, thereby affording a white solid. The solid was isolated by vacuum filtration then bag washed for 5 h with deionized water to give the title compound. The product was dried in vacuo at 55° C. overnight. Ex 1 was analyzed by $^1$H NMR to determine the $DS_{Pr}$=1.18, $DS_{2EH}$=0.41; $DS_{Np}$=1.26; and $DS_{OH}$=0.15.

Preparation of Example 2 (CP2EHNp): In a variation to Ex 1, to a dry 1 L, 4-neck resin kettle under nitrogen with mechanical stirring was added DMAC (2.22 mol) and NMI (0.47 mol). To the mixture was added Int 1 (0.104 mol), and the mixture was stirred 4 h at 32° C. to afford a dope. To the dope cooled to 26° C. was added neat 2EHCl (0.44 mol eq to Int 1) dropwise over 60 min, and the mixture was stirred at 26° C. for 2 h. To the reaction mixture was added NpCl (1.32 mol eq to Int 1) in DMAC (0.304 mol) dropwise over 120 min. The reaction mixture was stirred for 12 h. The dope was precipitated by pouring slowly into 2 L of iPOH using a high speed homogenizer to provide turbulent mixing, thereby affording a white solid. The solid was isolated by vacuum filtration then bag washed for 5 h with deionized water to give the title compound. The product was dried in vacuo at 55° C. overnight. Example 2 was analyzed by $^1$H NMR, 13C NMR to determine the $DS_{Pr}$=1.18, $DS_{2EH}$=0.45; $DS_{Np}$=1.31; $DS_{OH}$=0.06; C2DS=1.00; C3DS=0.84; C6DS=0.90.

Preparation of Comparative Example 3 (CPPvF): To a dry 250 mL Erlenmeyer flask equipped with a magnetic stir bar and capped with septum was charged anhydrous (1.76 mol) and NMI (0.18 mol). To the mixture was added with stirring Int 23 (0.038 mol). The mixture was stirred 3 h at 26° C. to afford a dope. To the dope was added with stirring furanoyl chloride (1.18 mol eq to Int 23) in DMAC (0.126 mol) over 2 minutes. The reaction was stirred at 26° C. for 16 hours. The product was precipitated by pouring into 1.2 L of methanol with homogenization to afford CEx 3 as a white solid. The solids were collected in a polypropylene weave bag and washed with methanol (2×800 mL). The washed product while still in the closed bag was transferred to a wash station and continuously washed with deionized water for 6 h. The product was centrifuged to remove excess water and then the product was transferred to a glass crystallization dish and dried in vacuo at 55° C. overnight. CEx 3 was analyzed by $^1$H NMR, 13C NMR to determine the $DS_{Pr}$=1.19, $DS_{Pv}$=0.45; $DS_F$=1.05; $DS_{OH}$=0.31; C2DS=0.96; C3DS=0.71; C6DS=0.89.

Preparation of Comparative Example 4 (CPPvNp): To a dry 1 L, 4-neck resin kettle under nitrogen with mechanical stirring was added DMAC (4.60 mol) and NMI (0.96 mol). To the mixture was added Int 1 (0.22 mol), and the mixture was stirred 4 h at 32° C. to afford a dope. To the dope cooled to 26° C. was added neat PvCl (0.43 mol eq to Int 1) dropwise over 1 h. The mixture was stirred 1 h. To the dope was added NpCl (1.20 mol eq to Int 1) in DMAC (0.612 mol), dropwise over 2 h. The mixture was stirred at 26° C. for 16 h. The dope was precipitated by pouring slowly into 4 L of iPOH using a high-speed homogenizer to provide turbulent mixing, thereby affording CEx 4 as solid. The solid was isolated by vacuum filtration then bag washed for 5 h with deionized water to give the title compound. The product was dried in vacuo at 55° C. overnight. CEx 4 was analyzed by $^1$H NMR to determine the $DS_{Pr}$=1.19, $DS_{Pv}$=0.40; $DS_{Np}$=1.20; and $DS_{OH}$=0.21.

Preparation of Comparative Example 5 (CPPvTCA): To a dry 500 mL Erlenmeyer flask equipped with a magnetic stir bar and capped with septum was charged anhydrous DMAC (3.44 mol) and NMI (0.365 mol). To the mixture was added with stirring Int 20 (0.077 mol). The mixture was stirred 3 h at 26° C. to afford a dope. To the dope was added with stirring TCACl (1.00 mol eq to Int 20) in DMAC (0.287 mol) over 2 min. The reaction was stirred at 26° C. for 16 hours. The product was precipitated by pouring into 2.2 L of methanol with homogenization to afford CEx 5. The solids were collected in a polypropylene weave bag and washed with methanol (2×800 mL). The washed product while still in the closed bag was transferred to a wash station and continuously washed with deionized water for 6 h. The product was centrifuged to remove excess water and then the product was transferred to a glass crystallization dish and dried in a vacuum oven at 55° C. overnight. CEx 5 was analyzed by $^1$H NMR to determine the $DS_{Pr}$=1.19, $DS_{Pv}$=0.42; $DS_{TCA}$=0.89; $DS_{OH}$=0.50.

Preparation of Example 6 (CP2EHTCA): In a variation to Ex 5, to a dry 500 mL Erlenmeyer flask equipped with a magnetic stir bar and capped with septum was charged anhydrous DMAC (1.73 mol) and NMI (0.18 mol). To the mixture was added Int 29 (0.036 mol), and the mixture was stirred 3 h at 26° C. to afford a dope. To the dope was added TCACl (1.0 mol eq to Int 29) by pouring the powder in the flask over 1 min, and the mixture was stirred at 26° C. for 16 h. The dope was precipitated by pouring slowly into 1.2 L of MeOH using a high-speed homogenizer to provide turbulent mixing, thereby affording Ex 6. Ex 6 was isolated by vacuum filtration then bag washed for 5 h with deionized water to give the title compound. The product was dried in vacuo at 55° C. overnight. Ex 6 was analyzed by 1H NMR to determine the $DS_{Pr}$=1.18, $DS_{2EH}$=0.42; $DS_{TCA}$=0.89; $DS_{OH}$=0.50.

The examples in Table 7 and 8 were synthesized by adapting the procedures for the synthesis of Ex 1-6. Table 7 provides product ID, the moles of cellulose ester intermediate, DMAC and NMI.

TABLE 7

| Ex # | Product | SM (Int #) | Int Type (mol) | DMAC (mol) | NMI (mol) |
|---|---|---|---|---|---|
| CEx 9 | CPPvNp | 9 | CP (433.7) | 9196 | 1902.7 |
| CEx 10 | CPPvNp | 9 | CP (433.7) | 9196 | 1902.7 |
| CEx 11 | CPPvNp | 9 | CP (433.7) | 9196 | 1902.7 |
| CEx 12 | CPPvF | 9 | CPPv (0.038) | 1.74 | 0.18 |
| CEx 15 | CPPvTCA | 24 | CPPv (0.077) | 3.44 | 0.37 |
| Ex 7 | CP2EHNp | 1 | CP (0.104) | 2.22 | 0.46 |
| Ex 8 | CP2EHNp | 1 | CP (0.104) | 2.21 | 0.49 |
| Ex 13 | CP2EHF | 1 | CP (0.18) | 3.91 | 0.81 |
| Ex 14 | CP2EHF | 1 | CP (0.504) | 21.23 | 4.4 |
| Ex 16 | CP2EHTCA | 15 | CP2EH (0.41) | 10.77 | 2.23 |

Table 8 provides the product ID, mode of addition and mole equivalents of AlkylCOCl (PvCl and 2EHCl) and ChCl (NpCl, TCACl and FCl).

TABLE 8

| Ex # | Product | AcylCl | Mode of Addn | Mol eq AcylCl vs Int | ChCl | Mode of Addn | Mol eq ChCl vs Int |
|---|---|---|---|---|---|---|---|
| CEx 9 | CPPvNp | PvCl | 1:1 DMAC | 0.43 | NpCl | 1:1 DMAC | 1.25 |
| CEx 10 | CPPvNp | PvCl | 1:1 DMAC | 0.522 | NpCl | 1:1 DMAC | 1.23 |
| CEx 11 | CPPvNp | PvCl | 1:1 DMAC | 0.522 | NpCl | 1:1 DMAC | 1.23 |
| CEx 12 | CPPvF | — | — | — | FCl | 1:1 DMAC | 1.09 |
| CEx 15 | CPPvTCA | — | — | — | TCACl | 1:1 DMAC | 1.00 |
| Ex 7 | CP2EHNp | 2EHCl | 1:1 DMAC | 0.400 | NpCl | 1:1 DMAC | 1.27 |
| Ex 8 | CP2EHNp | 2EHCl | 1:1 DMAC | 0.400 | NpCl | 1:1 DMAC | 1.27 |
| Ex 13 | CP2EHF | 2EHCl | neat | 0.42 | FCl | 1:1 DMAC | 1.02 |
| Ex 14 | CP2EHF | 2EHCl | neat | 0.4 | FCl | 1:1 DMAC | 1.05 |
| Ex 16 | CP2EHTCA | — | — | — | TCACl | 3:1 Toluene | 0.89 |

Table 9 provides the product ID and the degree of substitution for the Alkyl (Pr, Pv and 2EH), the Ch (Np, F and TCA), the OH and the total substituents as determined by $^1$H NMR.

TABLE 9

| ID # | Product | $DS_{Pr}$ | DSacyl | $DS_{Ch}$ | $DS_{Total}$ | $DS_{OH}$ |
|---|---|---|---|---|---|---|
| CEx 9 | CPPvNp | 1.18 | 0.42 (Pv) | 1.22 (Np) | 2.82 | 0.18 |
| CEx 10 | CPPvNp | 1.18 | 0.46 (Pv) | 1.26 (Np) | 2.90 | 0.10 |
| CEx 11 | CPPvNp | 1.17 | 0.45 (Pv) | 1.24 (Np) | 2.86 | 0.14 |
| CEx 12 | CPPvF | 1.19 | 0.38 (Pv) | 0.98 (F) | 2.55 | 0.45 |
| CEx 15 | CPPvTCA | 1.19 | 0.38 (Pv) | 0.77 (TCA) | 2.34 | 0.66 |
| Ex 7 | CP2EHNp | 1.18 | 0.39 (2EH) | 1.25 (Np) | 2.82 | 0.18 |
| Ex 8 | CP2EHNp | 1.18 | 0.39 (2EH) | 1.27 (Np) | 2.84 | 0.16 |
| Ex 13 | CP2EHF | 1.18 | 0.39 (2EH) | 0.96 (F) | 2.53 | 0.47 |
| Ex 14 | CP2EHF | 1.18 | 0.38 (2EH) | 1.08 (F) | 2.64 | 0.36 |
| Ex 16 | CP2EHTCA | 1.18 | 0.40 (2EH) | 0.85 (TCA) | 2.43 | 0.57 |

General Procedure for Film Casting

A solvent (DCM, 10% MeOH in DCM, 10% DCE in DCM, MEK, or MIPK) and the regioselective cellulose ester (12 wt %) and optionally a plasticizer (10 wt %, DEP or TPP) were mixed 24 hrs to make a homogeneous dope. From this dope, films were cast onto glass using a knife applicator and dried at 85.degree. C. in a forced air oven for 10 min. for dopes made from MEK. The cast films were annealed at 100.degree. C. and 120.degree. C. in a forced air oven for 10 min each. The thickness of the films was measured using a Metricon Prism Coupler 2010 (Metricon Corp.). The birefringence and retardations were measured using a M-2000V Ellipsometer (J. A. Woollam Co.). The haze and b* measurements were made using a HunterLab Ultrascan VIS colorimeter in diffused transmittance mode (1 inch diameter port). In the case of dopes, a 1 cm path length cell was used. For dope b* and haze, 10 measurements were taken, and the average was reported.

Preparation of Film 1-1: A dope of Ex 1 (12 wt %) in MEK was used to cast a film 7.5 μm thick giving the following optical properties. Δn=0.0101 (589 nm), $R_{th}$ [450 nm]/$R_{th}$[550 nm]=1.11 (dispersion); $R_{th}$=0.95 (650 nm/550 nm).

Tables 10 and 11 provides optical results for the compounds of this application. In all examples the casting solvent was MEK and there was no plasticizer added.

TABLE 10

| ID # | Starting Polymer | $R_e$ (589 nm) | $R_{th}$ (589 nm) | $R_{th}$(589 nm)/d |
|---|---|---|---|---|
| CFilm 3-1 | CEx 3 | 0.50 | 23.02 | 2.58 |
| CFilm 4-1 | CEx 4 | 1.16 | 89.98 | 9.65 |
| CFilm 9-1 | CEx 9 | 0.44 | 71.87 | 10.17 |
| CFilm 10-1 | CEx 10 | 4.22 | 66.18 | 9.52 |
| CFilm 11-1 | CEx 11 | 5.96 | 111.74 | 11.56 |
| CFilm 12-1 | CEx 12 | 0.30 | 9.43 | 1.07 |
| CFilm 15-1 | CEx 15 | 0.46 | 26.22 | 4.20 |
| Film 1-1 | Ex 1 | 0.24 | 76.41 | 10.13 |
| Film 2-1 | Ex 2 | 1.51 | 91.49 | 10.41 |
| Film 6-1 | Ex 6 | 0.19 | 31.56 | 5.02 |
| Film 7-1 | Ex 7 | 1.21 | 134.90 | 10.38 |
| Film 8-1 | Ex 8 | 0.78 | 126.16 | 10.35 |
| Film 13-1 | Ex 13 | 0.38 | 15.39 | 1.52 |
| Film 14-1 | Ex 14 | 0.31 | 17.59 | 2.08 |
| Film 16-1 | Ex 16 | 0.17 | 57.98 | 5.20 |

TABLE 11

| Film # | Starting Polymer | A $R_e$ 450/550 | B $R_e$ 650/550 | C $R_{th}$ 450/550 | D $R_{th}$ 650/550 | film color b* | film haze % |
|---|---|---|---|---|---|---|---|
| CFilm 2-1 | CEx 2 | 1.23 | 0.90 | 1.11 | 0.95 | 0.33 | 0.26 |
| CFilm 3-1 | CEx 3 | 1.01 | 1.00 | 1.14 | 0.93 | — | — |
| CFilm 4-1 | CEx 4 | 1.09 | 0.95 | 1.11 | 0.95 | 0.31 | 0.21 |
| CFilm 5-1 | CEx 5 | 1.05 | 0.92 | 1.19 | 0.92 | 0.70 | 0.41 |
| CFilm 9-1 | CEx 9 | 0.91 | 0.93 | 1.11 | 0.95 | 0.40 | 0.28 |
| CFilm 10-1 | CEx 10 | 1.10 | 0.95 | 1.11 | 0.95 | 0.35 | 0.19 |

TABLE 11-continued

| Film # | Starting Polymer | A R$_e$ 450/ 550 | B R$_e$ 650/ 550 | C R$_{th}$ 450/ 550 | D R$_{th}$ 650/ 550 | film color b* | film haze % |
|---|---|---|---|---|---|---|---|
| CFilm 11-1 | CEx 11 | 1.11 | 0.95 | 1.12 | 0.95 | 0.45 | 0.25 |
| CFilm 12-1 | CEx 12 | 1.00 | 1.01 | 1.29 | 0.86 | 0.23 | 0.23 |
| CFilm 15-1 | CEx 15 | 1.09 | 0.90 | 1.21 | 0.91 | 0.60 | 0.17 |
| Film 1-1 | Ex 1 | 0.89 | 0.38 | 1.11 | 0.95 | 0.22 | 0.11 |
| Film 6-1 | Ex 6 | 1.26 | 1.04 | 1.17 | 0.93 | 0.69 | 0.12 |
| Film 7-1 | Ex 7 | 1.08 | 0.97 | 1.11 | 0.95 | 0.35 | 0.30 |
| Film 8-1 | Ex 8 | 1.08 | 0.96 | 1.11 | 0.95 | 0.32 | 0.11 |
| Film 13-1 | Ex 13 | 1.04 | 0.97 | 1.20 | 0.90 | 0.23 | 0.16 |
| Film 14-1 | Ex 14 | 1.04 | 0.97 | 1.16 | — | 0.24 | 0.17 |
| Film 16-1 | Ex 16 | 1.15 | 0.96 | 1.18 | 0.92 | 0.55 | 0.14 |

Table 12 shows that the 2-ethylhexanoyl regioselectively substituted cellulose esters have lower Tg and Young's modulus and higher break strain relative to comparable pivaloyl regioselectively substituted cellulose esters. Moreover, some of the naphthoyl and pivaloyl regioselectively substituted cellulose esters were found to be too brittle to be tested. On the other hand, none of the 2-ethylhexanoyl and naphthoyl regioselectively substituted cellulose esters were found to be brittle. As a result, the 2-ethylhexanoyl regioselectively substituted cellulose esters exhibit better mechanical properties and are expected to be able to be made into thinner and larger films.

Table 12 provides the T$_g$, Break Strain (%) and Young's Modulus for select examples.

TABLE 12

| Film # | Product | Tg by DSC (° C. 2$^{nd}$ heat) | Break Strain (%) | Young's Modulus (MPa) |
|---|---|---|---|---|
| CFilm 3-1 | CPPvF | 176.9 | 22.0 | 25.5 |
| CFilm 4-1 | CPPvNp | 152.8 | * | * |
| CFilm 5-1 | CPPvTCA | 176.0 | 20.2 | 21.8 |
| CFilm 9-1 | CPPvNp | 155.5 | 2.29 | 17.5 |
| CFilm 10-1 | CPPvNp | 151.4 | 1.76 | 13.8 |
| CFilm 11-1 | CPPvNp | 152.9 | * | * |
| CFilm 12-1 | CPPvF | 188.0 | 14.8 | 24.1 |
| CFilm 15-1 | CPPvTCA | 174.1 | 18.2 | 21.9 |
| Film 1-1 | CP2EHNp | 130.8 | 4.17 | 16.7 |
| Film 2-1 | CP2EHNp | 135.7 | 3.95 | 23.1 |
| Film 6-1 | CP2EHTCA | 149.4 | 26.1 | 18.1 |
| Film 7-1 | CP2EHNp | 135.8 | 3.73 | 18.4 |
| Film 8-1 | CP2EHNp | 126.3 | 3.95 | 16.1 |
| Film 13-1 | CP2EHF | 157.4 | 30.0 | 21.3 |
| Film 14-1 | CP2EHF | 161.7 | 31.1 | 21.0 |
| Film 16-1 | CP2EHTCA | 150.9 | 31.4 | 18.8 |

* Film is too brittle to measure Break Strain and Young's Modulus

Other embodiments will be apparent to those skilled in the art from consideration of the specification and practice of the embodiments disclosed herein. It will be understood that variations and modifications can be effected within the spirit and scope of the disclosed embodiments. It is further intended that the specification and examples be considered as exemplary only, with a true scope and spirit of the disclosed embodiments being indicated by the following claims.

What is claimed is:

1. A regioselectively substituted cellulose ester comprising:
   (i) a plurality of 2-ethylhexanoyl ("2EH") substituents, wherein the cellulose ester has a degree of substitution for the 2EH ("DS$_{2EH}$") of from 0.1 to 1.0;
   (ii) a plurality of (C$_{1-6}$)alkyl-CO— ("AkCO") substituents, wherein the cellulose ester has a degree of substitution for AkCO ("DS$_{AkCO}$") of from 1.0 to 1.5;
   (iii) a plurality of hydroxy ("OH") substituents, wherein the cellulose ester has a degree of substitution for OH ("DS$_{OH}$") less than 0.8;
   (iv) a plurality of R$^1$—CO— ("ChCO") substituents, wherein the cellulose ester has a degree of substitution for ChCO ("DS$_{ChCO}$") of from 1.0 to 1.5,
   wherein:
   R$^1$ is
   (1) an (C$_{10-20}$)aryl, wherein the aryl is unsubstituted or substituted by 1-5 R$^2$,
   (2) a 5-10 membered heteroaryl having 1 to 4 heteroatoms chosen from N, O, or S, wherein heteroaryl is unsubstituted or substituted by 1-5 R$^2$,
   (3)

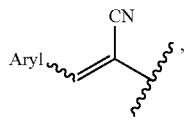

wherein the aryl is a (C$_{1-6}$)aryl, and wherein the aryl is unsubstituted or substituted by 1-5 R$^2$; or
   (4)

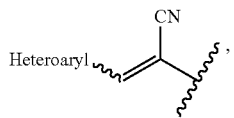

wherein the heteroaryl is a 5- to 10-membered ring having 1-4 heteroatoms chosen from N, O or S, and wherein the heteroaryl is unsubstituted or substituted by 1-5 R$^2$,
   each R$^2$ is independently chosen from nitro, cyano, (C$_{1-6}$)alkyl, halo(C$_{1-6}$)alkyl; (C$_{6-20}$)aryl-CO$_2$—, (C$_{6-20}$)aryl, (C$_{1-6}$)alkoxyl, halo(C$_{1-6}$)alkyoxyl, halo, 5-10 membered heteroaryl having 1-4 heteroatoms chosen from N, O, or S, or

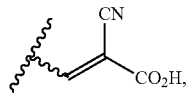

wherein the cellulose ester has a degree of substitution of the AkCO substituent at the C2 position ("C2DS$_{AkCO}$") in the range of from 0.2 to 0.3, a degree of substitution of AkCO substituent at the C3 position ("C3DS$_{AkCO}$") in the range of from 0.2 to 0.4, and a degree of substitution of AkCO substituent at the C6 position ("C6DS$_{AkCO}$") in the range of from 0.5 to 0.7,
   wherein the C6DS$_{2EH}$ is greater than the sum of C2DS$_{2EH}$ and C3DS$_{2EH}$.

2. The regioselectively substituted cellulose ester of claim 1, wherein the regioselectively substituted cellulose ester has a degree of substitution of the 2EH substituent at the C2 position ("C2DS$_{2EH}$") that is less than 0.1, a degree of substitution of the 2EH substituent at the C3 position ("C3DS$_{2EH}$") that is less than 0.1, and a degree of substitution of the 2EH substituent at the C6 position ("C6DS$_{2EH}$") that is in the range of from 0.15 to 0.40.

3. The regioselectively substituted cellulose ester of claim 1, wherein R$^1$ is an (C$_{10-20}$)aryl, wherein the aryl is unsubstituted or substituted by 1-5 R$^2$.

4. The regioselectively substituted cellulose ester of claim 3, wherein R$^1$ is an (C$_{10-20}$)aryl.

5. The regioselectively substituted cellulose ester of claim 3, wherein R$^1$ is naphthyl, unsubstituted or substituted by 1-5 R$^2$.

6. The regioselectively substituted cellulose ester of claim 1, wherein R$^1$ is a 5-10 membered heteroaryl having 1 to 4 heteroatoms chosen from N, O, or S, wherein the heteroaryl is unsubstituted or substituted by 1-5 R$^2$.

7. The regioselectively substituted cellulose ester of claim 6, wherein R$^1$ is an unsubstituted 5-10 membered heteroaryl having 1 to 4 heteroatoms chosen from N, O, or S.

8. The regioselectively substituted cellulose ester of claim 6, wherein R$^1$ is furanyl, pyrrolyl, thiophenyl, pypyridinyl, pyrazinyl, pyridazinyl, pyrimidinyl, quinolinyl, isoquinolinyl, quinoxalinyl, quinazolinyl, benzothiophenyl, or phthalazinyl, wherein each ring is unsubstituted or substituted by 1-5 R$^2$.

9. The regioselectively substituted cellulose ester of claim 8, wherein R$^1$ is furanyl, pyrrolyl, benzothiophenyl, or thiofuranyl, wherein each ring is unsubstituted or substituted by 1-5 R$^2$.

10. The regioselectively substituted cellulose ester of claim 1, wherein Akacyl is acetyl, propionyl, butanoyl, pentanoyl, or hexanoyl.

11. The regioselectively substituted cellulose ester of claim 10 wherein AkCO is propionyl.

12. The regioselectively substituted cellulose ester of claim 1, wherein R$^1$ is naphthyl, furanyl, or

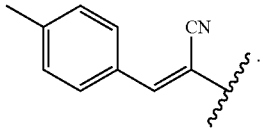 [SMILES: */C(C#N)=C/c1ccc(C)cc1]

13. The regioselectively substituted cellulose ester of claim 1, wherein the DS$_{2EH}$ is from 0.3 to 0.5.

14. The regioselectively substituted cellulose ester of claim 13, wherein the DS$_{ChCO}$ is from 0.7 to 1.4.

15. The regioselectively substituted cellulose ester of claim 14, wherein the DS$_{OH}$ is less than 0.6.

16. The regioselectively substituted cellulose ester of claim 1 wherein the cellulose ester has a glass transition temperature ("T$_g$") that is less than 170° C. as determined according to ASTM E1356-03.

17. The regioselectively substituted cellulose ester of claim 1, wherein the cellulose ester has a break strain that is greater than 3% as determined according to ASTM D882-18.

18. A film comprising the regioselectively substituted cellulose ester of claim 1.

* * * * *